(12) United States Patent
Gurley et al.

(10) Patent No.: US 9,188,375 B2
(45) Date of Patent: Nov. 17, 2015

(54) CONTROL ELEMENT AND CHECK VALVE ASSEMBLY

(71) Applicant: Zhejiang DunAn Hetian Metal Co., Ltd., Zhuji, Zhejiang (CN)

(72) Inventors: Gengxun Kara Gurley, Hutto, TX (US); Edward Nelson Fuller, Manchester, MI (US); Parthiban Arunasalam, Austin, TX (US)

(73) Assignee: ZHEJIANG DUNAN HETIAN METAL CO., LTD., Zhuji, Zhejiang (CN)

( * ) Notice: Subject to any disclaimer, the term of this patent is extended or adjusted under 35 U.S.C. 154(b) by 107 days.

(21) Appl. No.: 14/096,799

(22) Filed: Dec. 4, 2013

(65) Prior Publication Data

US 2015/0153081 A1 Jun. 4, 2015

Related U.S. Application Data

(60) Provisional application No. 61/732,922, filed on Dec. 4, 2013.

(51) Int. Cl.
*F16K 17/00* (2006.01)
*F25B 41/06* (2006.01)
(Continued)

(52) U.S. Cl.
CPC ............... *F25B 41/062* (2013.01); *F16K 3/26* (2013.01); *F16K 15/183* (2013.01); *F16K 31/42* (2013.01); *F16K 99/0011* (2013.01); *F25B 41/046* (2013.01); *G05D 7/0635* (2013.01)

(58) Field of Classification Search
CPC ....................... F25B 41/062; Y10T 137/87563
USPC ................... 137/493, 601.13, 601.2, 601.21, 137/625.28, 625.34, 625.35; 236/92 B; 62/160, 324.1, 324.6, 527, 528
See application file for complete search history.

(56) References Cited

U.S. PATENT DOCUMENTS 886,045 A 4/1908 Ehrlich et al.
1,886,205 A 11/1932 Lyford
(Continued)

FOREIGN PATENT DOCUMENTS

DE 2215526 10/1973
DE 2930779 2/1980
(Continued)

OTHER PUBLICATIONS

Alpha Exactalloy Solder Performs [online], [retrieved Jan. 5, 2011]. Retrieved from the Internet <URL: http://alpha.cooksonelectronics.com/products/preforms/>.
(Continued)

*Primary Examiner* — John K Fristoe, Jr.
*Assistant Examiner* — Reinaldo Sanchez-Medina
(74) *Attorney, Agent, or Firm* — MacMillan, Sobanski & Todd, LLC

(57) ABSTRACT

An arrangement includes a housing defining a first and second ports. A first passageway provides communication between the ports; a second passageway provides communication with the first port. An element is disposed in the housing and positioned by a balance of forces, the element is positionable to throttled positions for controlling flow through the first passageway in a first direction and to an open position to permit unrestricted flow in a second direction. A check valve is disposed in the second passageway for preventing flow therein from the first port when pressure in the first port is greater than pressure in the second port, and permitting flow through the second passageway to the first port when pressure in the first port is less than the pressure in the second port thereby affecting the balance of forces acting on the element so the element is urged toward the fully open position.

19 Claims, 18 Drawing Sheets

(51) Int. Cl.
   *F16K 99/00*   (2006.01)
   *G05D 7/06*    (2006.01)
   *F25B 41/04*   (2006.01)
   *F16K 31/42*   (2006.01)
   *F16K 3/26*    (2006.01)
   *F16K 15/18*   (2006.01)

(56) References Cited

U.S. PATENT DOCUMENTS

| | | |
|---|---|---|
| 1,926,031 A | 9/1933 | Boynton |
| 2,412,205 A | 12/1946 | Cook |
| 2,504,055 A | 4/1950 | Thomas |
| 2,651,325 A | 9/1953 | Lusignan |
| 2,840,107 A | 6/1958 | Campbell |
| 2,875,779 A | 3/1959 | Campbell |
| 3,031,747 A | 5/1962 | Green |
| 3,540,218 A | 11/1970 | Finn |
| 3,729,807 A | 5/1973 | Fujiwara |
| 3,747,628 A | 7/1973 | Holster et al. |
| 3,860,949 A | 1/1975 | Stoeckert et al. |
| 4,005,454 A | 1/1977 | Froloff et al. |
| 4,019,388 A | 4/1977 | Hall, II et al. |
| 4,023,725 A | 5/1977 | Ivett et al. |
| 4,100,236 A | 7/1978 | Gordon et al. |
| 4,152,540 A | 5/1979 | Duncan et al. |
| 4,181,249 A | 1/1980 | Peterson et al. |
| 4,298,023 A | 11/1981 | McGinnis |
| 4,341,816 A | 7/1982 | Lauterbach et al. |
| 4,354,527 A | 10/1982 | McMillan |
| 4,372,486 A | 2/1983 | Tomioka et al. |
| 4,434,813 A | 3/1984 | Mon |
| 4,476,893 A | 10/1984 | Schwelm |
| 4,543,875 A | 10/1985 | Imhof |
| 4,548,047 A | 10/1985 | Hayashi et al. |
| 4,581,624 A | 4/1986 | O'Connor |
| 4,593,719 A | 6/1986 | Leonard et al. |
| 4,628,576 A | 12/1986 | Giachino et al. |
| 4,647,013 A | 3/1987 | Giachino et al. |
| 4,661,835 A | 4/1987 | Gademann et al. |
| 4,687,419 A | 8/1987 | Suzuki et al. |
| 4,752,027 A | 6/1988 | Gschwend |
| 4,772,935 A | 9/1988 | Lawler et al. |
| 4,774,760 A | 10/1988 | Seaman et al. |
| 4,821,997 A | 4/1989 | Zdeblick |
| 4,824,073 A | 4/1989 | Zdeblick |
| 4,826,131 A | 5/1989 | Mikkor |
| 4,828,184 A | 5/1989 | Gardner et al. |
| 4,852,364 A | 8/1989 | Seener et al. |
| 4,869,282 A | 9/1989 | Sittler et al. |
| 4,938,742 A | 7/1990 | Smits |
| 4,943,032 A | 7/1990 | Zdeblick |
| 4,946,350 A | 8/1990 | Suzuki et al. |
| 4,959,581 A | 9/1990 | Dantlgraber |
| 4,964,567 A | 10/1990 | Heffner et al. |
| 4,966,646 A | 10/1990 | Zdeblick |
| 4,978,062 A | 12/1990 | Lange, Sr. |
| 5,000,009 A | 3/1991 | Clanin |
| 5,029,805 A | 7/1991 | Albarda et al. |
| 5,037,778 A | 8/1991 | Stark et al. |
| 5,050,838 A | 9/1991 | Beatty et al. |
| 5,052,192 A | 10/1991 | Drucker |
| 5,054,522 A | 10/1991 | Kowanz et al. |
| 5,058,856 A | 10/1991 | Gordon et al. |
| 5,061,914 A | 10/1991 | Busch et al. |
| 5,064,165 A | 11/1991 | Jerman |
| 5,065,978 A | 11/1991 | Albarda et al. |
| 5,066,533 A | 11/1991 | America et al. |
| 5,069,419 A | 12/1991 | Jerman |
| 5,074,629 A | 12/1991 | Zdeblick |
| 5,082,242 A | 1/1992 | Bonne et al. |
| 5,096,643 A | 3/1992 | Kowanz et al. |
| 5,116,457 A | 5/1992 | Jerman |
| 5,131,729 A | 7/1992 | Wetzel |
| 5,133,379 A | 7/1992 | Jacobsen et al. |
| 5,142,781 A | 9/1992 | Mettner et al. |
| 5,161,774 A | 11/1992 | Engelsdorf et al. |
| 5,169,472 A | 12/1992 | Goebel |
| 5,176,358 A | 1/1993 | Bonne et al. |
| 5,177,579 A | 1/1993 | Jerman |
| 5,178,190 A | 1/1993 | Mettner |
| 5,179,499 A | 1/1993 | MacDonald et al. |
| 5,180,623 A | 1/1993 | Ohnstein |
| 5,197,517 A | 3/1993 | Perera |
| 5,209,118 A | 5/1993 | Jerman |
| 5,215,244 A | 6/1993 | Buchholz et al. |
| 5,216,273 A | 6/1993 | Doering et al. |
| 5,217,283 A | 6/1993 | Watanabe |
| 5,222,521 A | 6/1993 | Kihlberg |
| 5,238,223 A | 8/1993 | Mettner et al. |
| 5,244,537 A | 9/1993 | Ohnstein |
| 5,251,459 A * | 10/1993 | Grass et al. ............... 62/324.1 |
| 5,267,589 A | 12/1993 | Watanabe |
| 5,271,431 A | 12/1993 | Mettner et al. |
| 5,271,597 A | 12/1993 | Jerman |
| 5,309,943 A | 5/1994 | Stevenson et al. |
| 5,323,999 A | 6/1994 | Bonne et al. |
| 5,325,880 A | 7/1994 | Johnson et al. |
| 5,333,831 A | 8/1994 | Barth et al. |
| 5,336,062 A | 8/1994 | Richter |
| 5,355,712 A | 10/1994 | Petersen et al. |
| 5,368,704 A | 11/1994 | Madou et al. |
| 5,375,919 A | 12/1994 | Furuhashi |
| 5,400,824 A | 3/1995 | Gschwendtner et al. |
| 5,417,235 A | 5/1995 | Wise et al. |
| 5,445,185 A | 8/1995 | Watanabe et al. |
| 5,458,405 A | 10/1995 | Watanabe |
| 5,524,819 A | 6/1996 | Heffner et al. |
| 5,543,349 A | 8/1996 | Kurtz et al. |
| 5,553,790 A | 9/1996 | Findler et al. |
| 5,566,703 A | 10/1996 | Watanabe et al. |
| 5,577,533 A | 11/1996 | Cook, Jr. |
| 5,589,422 A | 12/1996 | Bhat |
| 5,611,214 A | 3/1997 | Wegeng et al. |
| 5,785,295 A | 7/1998 | Tsai |
| 5,796,169 A | 8/1998 | Dockerty et al. |
| 5,810,325 A | 9/1998 | Carr |
| 5,838,351 A | 11/1998 | Weber |
| 5,848,605 A | 12/1998 | Bailey et al. |
| 5,856,705 A | 1/1999 | Ting |
| 5,873,385 A | 2/1999 | Bloom et al. |
| 5,908,098 A | 6/1999 | Gorman et al. |
| 5,909,078 A | 6/1999 | Wood et al. |
| 5,924,622 A | 7/1999 | Davis et al. |
| 5,926,955 A | 7/1999 | Kober |
| 5,941,608 A | 8/1999 | Campau et al. |
| 5,954,079 A | 9/1999 | Barth et al. |
| 5,955,817 A | 9/1999 | Dhuler et al. |
| 5,970,998 A | 10/1999 | Talbot et al. |
| 5,994,816 A | 11/1999 | Dhuler et al. |
| 6,019,437 A | 2/2000 | Barron et al. |
| 6,023,121 A | 2/2000 | Dhuler et al. |
| 6,038,928 A | 3/2000 | Maluf et al. |
| 6,041,650 A | 3/2000 | Swindler et al. |
| 6,076,366 A | 6/2000 | Takano et al. |
| 6,095,400 A | 8/2000 | Liu |
| 6,096,149 A | 8/2000 | Hetrick et al. |
| 6,105,737 A | 8/2000 | Weigert et al. |
| 6,114,794 A | 9/2000 | Dhuler et al. |
| 6,116,863 A | 9/2000 | Ahn et al. |
| 6,123,316 A | 9/2000 | Biegelsen et al. |
| 6,124,663 A | 9/2000 | Haake et al. |
| 6,171,972 B1 | 1/2001 | Mehregany et al. |
| 6,182,742 B1 | 2/2001 | Takahashi et al. |
| 6,224,445 B1 | 5/2001 | Neukermans et al. |
| 6,255,757 B1 | 7/2001 | Dhuler et al. |
| 6,279,606 B1 | 8/2001 | Hunnicutt et al. |
| 6,283,441 B1 | 9/2001 | Tian |
| 6,318,101 B1 | 11/2001 | Pham et al. |
| 6,321,549 B1 | 11/2001 | Reason et al. |
| 6,386,507 B2 | 5/2002 | Dhuler et al. |
| 6,390,782 B1 | 5/2002 | Booth et al. |
| 6,408,876 B1 | 6/2002 | Nishimura et al. |
| 6,418,741 B1 | 7/2002 | Nungesser et al. |

(56) References Cited

U.S. PATENT DOCUMENTS

| | | |
|---|---|---|
| 6,494,804 B1 | 12/2002 | Hunnicutt et al. |
| 6,505,811 B1 | 1/2003 | Barron et al. |
| 6,520,197 B2 | 2/2003 | Deshmukh et al. |
| 6,523,560 B1 | 2/2003 | Williams et al. |
| 6,533,366 B1 | 3/2003 | Barron et al. |
| 6,540,203 B1 | 4/2003 | Hunnicutt |
| 6,581,640 B1 | 6/2003 | Barron |
| 6,637,722 B2 | 10/2003 | Hunnicutt |
| 6,662,581 B2 | 12/2003 | Hirota et al. |
| 6,694,998 B1 | 2/2004 | Hunnicutt |
| 6,724,718 B1 | 4/2004 | Shinohara et al. |
| 6,755,761 B2 | 6/2004 | Hunnicutt et al. |
| 6,761,420 B2 | 7/2004 | Maluf et al. |
| 6,845,962 B1 | 1/2005 | Barron et al. |
| 6,857,501 B1 | 2/2005 | Han et al. |
| 6,872,902 B2 | 3/2005 | Cohn et al. |
| 6,902,988 B2 | 6/2005 | Barge et al. |
| 6,958,255 B2 | 10/2005 | Khuri-Yakub et al. |
| 6,966,329 B2 | 11/2005 | Liberfarb |
| 7,011,378 B2 | 3/2006 | Maluf et al. |
| 7,063,100 B2 | 6/2006 | Liberfarb |
| 7,210,502 B2 | 5/2007 | Fuller et |
| 7,367,359 B2 | 5/2008 | Maluf et al. |
| 7,372,074 B2 | 5/2008 | Milne et al. |
| 7,449,413 B1 | 11/2008 | Achuthan et al. |
| 7,452,800 B2 | 11/2008 | Sosnowchik et al. |
| 7,624,930 B2 * | 12/2009 | Honda et al. ............... 236/92 B |
| 8,113,448 B2 | 2/2012 | Keating |
| 8,113,482 B2 | 2/2012 | Hunnicutt |
| 8,151,583 B2 | 4/2012 | Douglas |
| 8,156,962 B2 | 4/2012 | Luckevich |
| 8,157,184 B2 | 4/2012 | Hayashi et al. |
| 8,540,207 B2 | 9/2013 | Hunnicutt et al. |
| 8,593,811 B2 | 11/2013 | Price et al. |
| 2002/0014106 A1 | 2/2002 | Srinivasan et al. |
| 2002/0029814 A1 | 3/2002 | Unger et al. |
| 2002/0096421 A1 | 7/2002 | Cohn et al. |
| 2002/0174891 A1 | 11/2002 | Maluf et al. |
| 2003/0061889 A1 | 4/2003 | Tadigadapa et al. |
| 2003/0098612 A1 | 5/2003 | Maluf et al. |
| 2003/0159811 A1 | 8/2003 | Nurmi |
| 2003/0206832 A1 | 11/2003 | Thiebaud et al. |
| 2004/0115905 A1 | 6/2004 | Barge et al. |
| 2004/1115905 | 6/2004 | Barge et al. |
| 2005/0121090 A1 | 6/2005 | Hunnicutt |
| 2005/0200001 A1 | 9/2005 | Joshi et al. |
| 2005/0205136 A1 | 9/2005 | Freeman |
| 2006/0017125 A1 | 1/2006 | Lee et al. |
| 2006/0067649 A1 | 3/2006 | Tung et al. |
| 2006/0218953 A1 | 10/2006 | Hirota |
| 2007/0251586 A1 | 11/2007 | Fuller et al. |
| 2007/0289941 A1 | 12/2007 | Davies |
| 2008/0028779 A1 | 2/2008 | Song |
| 2008/0042084 A1 | 2/2008 | Fuller |
| 2008/0047283 A1 | 2/2008 | Pham et al. |
| 2008/0072977 A1 | 3/2008 | George et al. |
| 2008/0073441 A1 * | 3/2008 | Honda et al. ............... 236/92 B |
| 2008/0229770 A1 | 9/2008 | Liu |
| 2008/0271788 A1 | 11/2008 | Matsuzaki et al. |
| 2009/0020716 A1 | 1/2009 | Hokazono et al. |
| 2009/0123300 A1 | 5/2009 | Uibel |
| 2009/0186466 A1 | 7/2009 | Brewer |
| 2010/0019177 A1 | 1/2010 | Luckevich |
| 2010/0038576 A1 | 2/2010 | Hunnicutt |
| 2010/0204840 A1 | 8/2010 | Sun et al. |
| 2010/0225708 A1 | 9/2010 | Peng et al. |
| 2012/0000550 A1 | 1/2012 | Hunnicutt et al. |
| 2013/0243032 A1 | 9/2013 | Arunasalam et al. |

FOREIGN PATENT DOCUMENTS

| | | |
|---|---|---|
| DE | 3401404 | 7/1985 |
| DE | 4101575 | 7/1992 |
| DE | 4417251 | 11/1995 |
| DE | 4422942 | 1/1996 |
| EP | 250948 | 1/1988 |
| EP | 261972 | 3/1988 |
| EP | 1024285 | 8/2000 |
| GB | 2238267 | 5/1991 |
| JP | Sho 39-990 | 2/1964 |
| JP | 04-000003 | 1/1992 |
| JP | 06-117414 | 4/1994 |
| JP | 2001184125 | 7/2001 |
| JP | 2003-049933 | 2/2003 |
| JP | Sho 63-148062 | 7/2003 |
| JP | 2006-080194 | 3/2006 |
| WO | 99/16096 A1 | 4/1999 |
| WO | 99/24783 A1 | 5/1999 |
| WO | 00/14415 A2 | 3/2000 |
| WO | 00/14415 A3 | 7/2000 |
| WO | 2005/084211 A2 | 9/2005 |
| WO | 2005/084211 A3 | 1/2006 |
| WO | 2006/076386 A1 | 7/2006 |
| WO | 2008/076388 A1 | 6/2008 |
| WO | 2008/076388 B1 | 8/2008 |
| WO | 2008/121365 A1 | 10/2008 |
| WO | 2008/121369 A1 | 10/2008 |
| WO | 2010/019329 A3 | 2/2010 |
| WO | 2010/019665 A2 | 2/2010 |
| WO | 2010/065804 A2 | 6/2010 |
| WO | 2011/022267 A2 | 2/2011 |
| WO | 2011/094300 A2 | 8/2011 |
| WO | 2011/094302 A2 | 8/2011 |

OTHER PUBLICATIONS

Asuha, Hikaru Kobayashi et al, "Nitric acid oxidation of Si to form ultrathin silicon dioxide layers with a low leakage current density", 2003, Journal of Applied Physics, 94, 7328.

Ayon et al., "Etching Characteristics and Profile Control in a Time Multiplexed ICP Etcher," Proc. of Solid State Sensor and Actuator Workshop Technical Digest, Hilton Head SC, (Jun. 1998) 41-44.

B.E. Deal and A.S. Grove, "General relationship for the thermal Oxidation of Silicon", 1965, Journal of Applied Physics, 36, 3770.

Bachmann, Stephan, "Electronic Expansion Valves: Fitters Notes (Part 8)", Danfoss Fitters Notes, Jul. 2008.

Bartha et al., "Low Temperature Etching of Si in High Density Plasma Using SF6/02," Microelectronic Engineering, and Actuator Workshop Technical Digest, Hilton Head SC, (Jun. 1998) 41-44.

Booth, Steve and Kaina, Rachid, Fluid Handling—Big Gains from Tiny Valve, Appliance Design (Apr. 2008), pp. 46-48.

Changenet et al., "Study on predictive functional control of an expansion valve for controlling the evaporator superheat", Proc.IMechE vol. 222 Part I, May 28, 2008, pp. 571-582.

Clark, Scott, "Etching Silicon Dioxide with Aqueous HF Solutions", Copyright 1998-2000, Bold Technologies Inc., http://www.boldtech.com/technical/silicon_dioxide.htm.

Controls Overview for Microstaq Silicon Expansion Valve (SEV), Rev. 1, Dec. 2008 [online], [retrieved May 17, 2010]. Retrieved from the Internet <URL: http://www.microstaq.com/pdf/SEV_controls.pdf>.

Copeland, Michael V., Electronic valves promise big energy savings, FORTUNE, Sep. 9, 2008 [online], [retrieved Sep. 9, 2008]. Retrieved from the internet <URL: http://techland.blogs.fortune.cnn.com/2008/09/09/electronic-valves-promise-big-energy-savings>.

Fung et al., "Deep Etching of Silicon Using Plasma" Proc. of the Workshop on Micromachining and Micropackaging of Transducers, (Nov. 7-8, 1984) pp. 159-164.

Gui, C. et al, "Selective Wafer Bonding by Surface Roughness Control", Journal of the Electrochemical Society, 148 (4) G225-G228 (2001).

Gui, C. et al., "Fusion bonding of rough surfaces with polishing technique for silicon micromachining", Microsystem Technologies (1997) 122-128.

Günther, Götz, "Entwicklung eines pneumatischen 3/2-Wege-Mikroventils", O + P Olhydraulik Und Pneumatik, Vereinigte Fachverlage, Mainz, DE, vol. 42, No. 6, Jun. 1, 1998, pp. 396-398, XP000831050, ISSN: 0341-2660.

(56) References Cited

OTHER PUBLICATIONS

Higginbotham, Stacey, Microstaq's Tiny Valves Mean Big Energy Savings [online], [retrieved Dec. 8, 2008]. Retrieved from the Internet <URL: http//earth2tech.com/2008/09/09/microstaqs-tiny-valves-mean-big-energy savings (posted Sep. 9, 2008)>.

J. Mark Noworolski, et al.,"Process for in-plane and out-of-plane single-crystal-silicon thermal microactuators", Sensors and Actuators A 55 (1996); pp. 65-69.

Jonsmann et al., "Compliant Electra-thermal Microactuators", IEEE Technical Digest, Twelfth IEEE International Conference on Micro Electro Mechanical Systems Jan. 17-21, 1999, Orlando, Florida, pp. 588-593, IEEE Catalog No. 99CH36291C.

K.R. Williams et al., "A Silicon Microvalve for the Proportional Control of Fluids", Transducers '99, Proc. 10th International Conference on Solid State Sensors and Actuators, held Jun. 7-10, 1999, Sendai, Japan, pp. 18-21.

Keefe, Bob, Texas firm says value-replacing chip can drastically cut energy use, Atlanta Metro News, Sep. 10, 2008 [online], [retrieved Sep. 10, 2008]. Retrieved from the Internet <URL: hftp://www.ajc.com/search/content/shared/money/stories/2008/09/microstaq10_cox-F9782.html>.

Klaassen et al., "Silicon Fusion Bonding and Deep Reactive Ion Etching; A New Technology for Microstructures," Proc., Transducers 95 Stockholm Sweden, (1995) 556-559.

Linder et al., "Deep Dry Etching Techniques as a New IC Compatible Tool for Silicon Micromachining," Proc, Transducers, vol. 91, (Jun. 1991) pp. 524-527.

Luckevich, Mark, MEMS microvlaves: the new valve world, Valve World (May 2007), pp. 79-83.

Madou, Marc, "Fundamentals of Microfabrication", Boca Raton: CRC Press, 1997, 405-406.

MEMS, Microfluidics and Microsystems Executive Review [online], Posted Apr. 16, 2009. [retrieved May 17, 2010]. Retrieved from the Internet <URL: http:www.memsinvestorjournal.com/2009/04/mems-applications-for-flow-control-.html>.

Microstaq Announces High Volume Production of MEMS-Based Silicon Expansion Valve [onlne], [retrieved Jan. 27, 2010]. Retrieved from the Internet <URL: http://www.earthtimes.org/articles/printpressstory.php?news+1138955 (posted Jan. 27, 2010)>.

Microstaq Product Description, Proportional Piloted Silicon Control Valve (CPS-4) [online], Published 2008, [retrieved May 17, 2010]. Retrieved from the Internet <URL: http://www.microstaq.com/products/cps4.html>.

Microstaq Product Description, Proportional Direct Acting Silicon Control Valve (PDA-3) [online], Published 2008, [retrieved May 17, 2010]. Retrieved from the Internet <URL: http://www.microstaq.com/products/pda3.html>.

Microstaq Product Descriptions, SEV, CPS-4, and PDA-3 [online], Published 2009, [retrieved May 17, 2010]. Retrieved from the Internet <URL: http://www.microstaq.com/products/index.html>.

Microstaq Technology Page [online], Published 2008, [retrieved May 17, 2010]. Retrieved from the Internet <URL: http://www.microstaq.com/technology/index.html>.

Petersen et al. "Surfaced Micromachined Structures Fabricated with Silicon Fusion Bonding" Proc., Transducers 91, (Jun. 1992) pp. 397-399.

Press Release, Freescale and Microstaq Join Forces on Smart Superheat Control System for HVAC and Refrigeration Efficiency (posted Jan. 22, 2008) [online], [retrieved May 17, 2010]. Retrieved from the Internet <URL: http://www.microstaq.com/pressReleases/prDetail_04.html>.

Press Release, Microstaq Mastering Electronic Controls for Fluid-Control Industry (posted May 5, 2005) [online[, [retrieved May 17, 2010]. Retrieved from the Internet <URL: http://www.microstaq.com/pressReleases/prDetail_02.html>.

Press Release, Microstaq Unveils Revolutionary Silicon Expansion Valve at Demo 2008 [online], [retrieved May 17, 2010]. Retrieved from the Internet <URL: http://www.microstaq.com/pressReleases/prDetail_05.html (posted Sep. 8, 2008)>.

Press Release, Nanotechnology Partnerships, Connections Spur Innovation for Fluid Control Industries (posted Jun. 9, 2005) [online], [retrieved May 17, 2010]. Retrieved from the Internet <URL: http://www.microstaq.com/pressReleases/prDetail_03.html>.

Product Review, greentechZONE Products for the week of May 18, 2009 [online], [retrieved May 17, 2010]. Retrieved from the Internet <URL: http://www.en-genius.net/site/zones/greentechZONE/product_reviews/grnp_051809>.

SEV Installation Instructions [online], [retrieved May 17, 2010]. Retrieved from the Internet <URL: http://www.microstaq.com/pdf/SEV_Instruction_sheet.pdf>.

Silicon Expansion Valve Data Sheet [online], [retrieved May 17, 2010]. Retrieved from the Internet <URL: http://www.microstaq.com/pdf/SEV_Datasheet_1_8.pdf>.

Silicon Expansion Valve (SEV)—For Heating, Cooling, and Refrigeration Applications [online], [retrieved May 17, 2010]. Retrieved from the Internet <URL: http://www.microstaq.com/pdf/SEV_Quicksheet.pdf>.

Silicon Expansion Valve Information Sheet [online], [retrieved May 17, 2010]. Retrieved from the Internet <URL: http://www.microstaq.com/pdf/SEV_Infosheet_2_0.pdf>.

SMIC Announces Successful Qualification of a MEMS Chip for Microstaq (posted Oct. 26, 2009) [online], [retrieved May 17, 2010]. Retrieved from the Internet <URL: http://www.prnewswire.com/news-releases/smic-announces-successful-qualification-of-a-mems-chip-for-microstaq-65968252.html (posted Oct. 26, 2009)>.

SMIC quals Microstaq MEMS chip for fluid control (posted Oct. 26, 2009) [online], [retrieved May 17, 2010]. Retrieved from the Internet <URL: http://www.electroiq.com/ElectroiQ/en-us/index/display/Nanotech_Article_Tools_Template.articles.small-times.nanotechmems.mems.microfluidics.2009.10.smic-quals_microstaq.html>.

Tiny Silicon Chip Developed by Microstaq Will Revolutionize Car Technology (posted May 19, 2005) [online], [retrieved May 19, 2005]. Retrieved from the Internet <URL: http://www.nsti.org/press/PRshow.html?id=160>.

Turpin, Joanna R., Soft Economy, Energy Prices Spur Interest in Technologies [online], Published Dec. 8, 2008. [retrieved May 18, 2010]. Retrieved from the Internet <URL: http://www.achrnews.com/copyright/BNP_GUID_9-5-2006_A_10000000000000483182>.

Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.

Yunkin et al., "Highly Anisotropic Selective Reactive Ion Etching of Deep Trenches in Silicon," Microelectronic Engineering, Elsevier Science B.V., vol. 23, (1994) pp. 373-376.

Zhang, Chunbo et al, "Fabrication of thick silicon dioxide layers for thermal isolation", 2004, J.Micromech. Microeng. 14 769-774.

Zhixiong Liu et al., "Micromechanism fabrication using silicon fusion bonding", Robotics and Computer Integrated Manufacturing 17 (2001) 131-137.

\* cited by examiner

| Mode of Operation | A | B | C | D | E |
|---|---|---|---|---|---|
| Air Conditioning (Clockwise Flow) | Hot Gas High Pressure | Cold Liquid High Pressure | Cold Liquid High Pressure | Cold Liquid Low Pressure | Hot Gas Low Pressure |
| Heating (Counterclockwise Flow) | Hot Gas Low Pressure | Cold Liquid Low Pressure | Cold Liquid High Pressure | Cold Liquid High Pressure | Hot Gas High Pressure |

FIG. 4

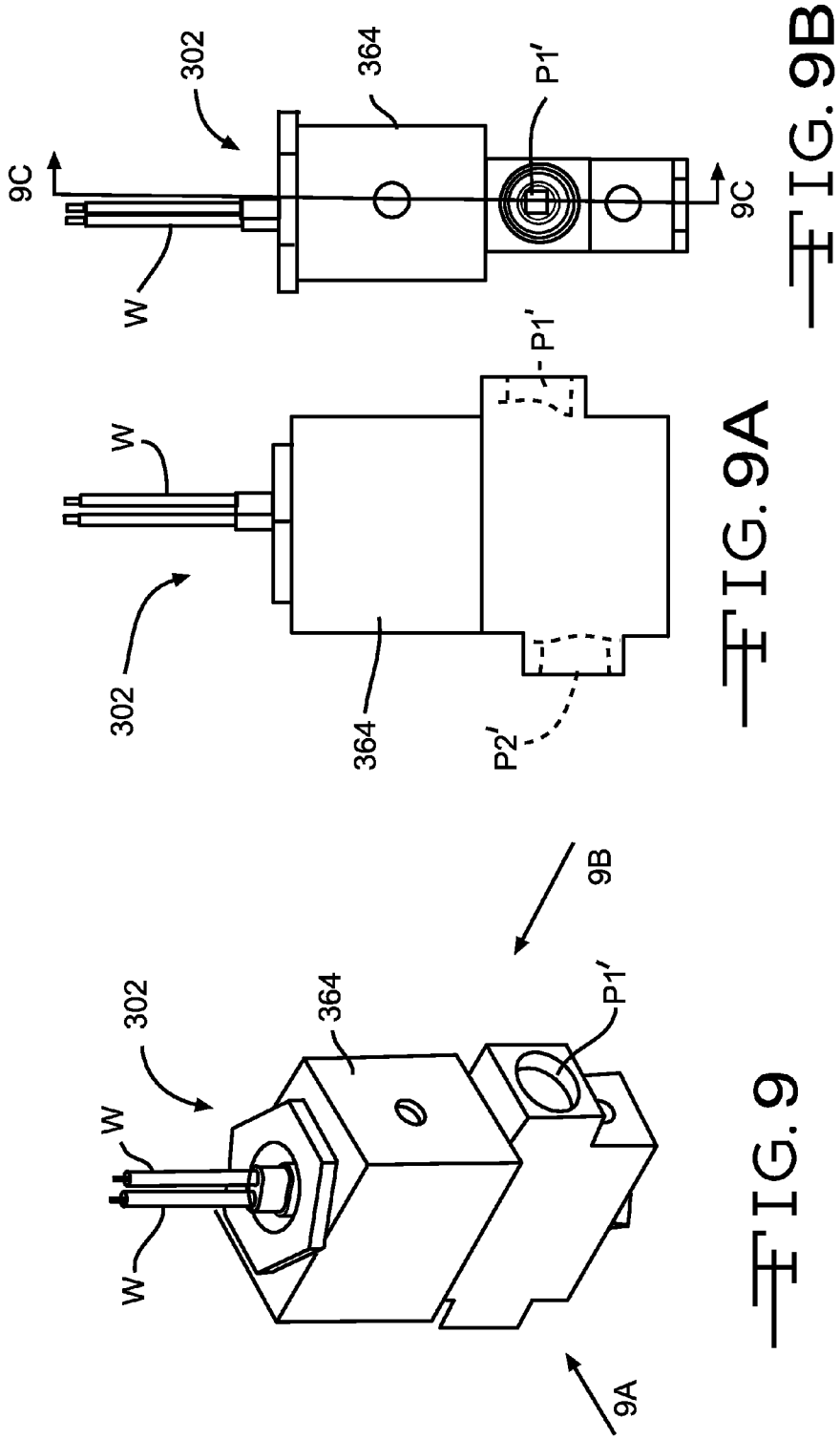

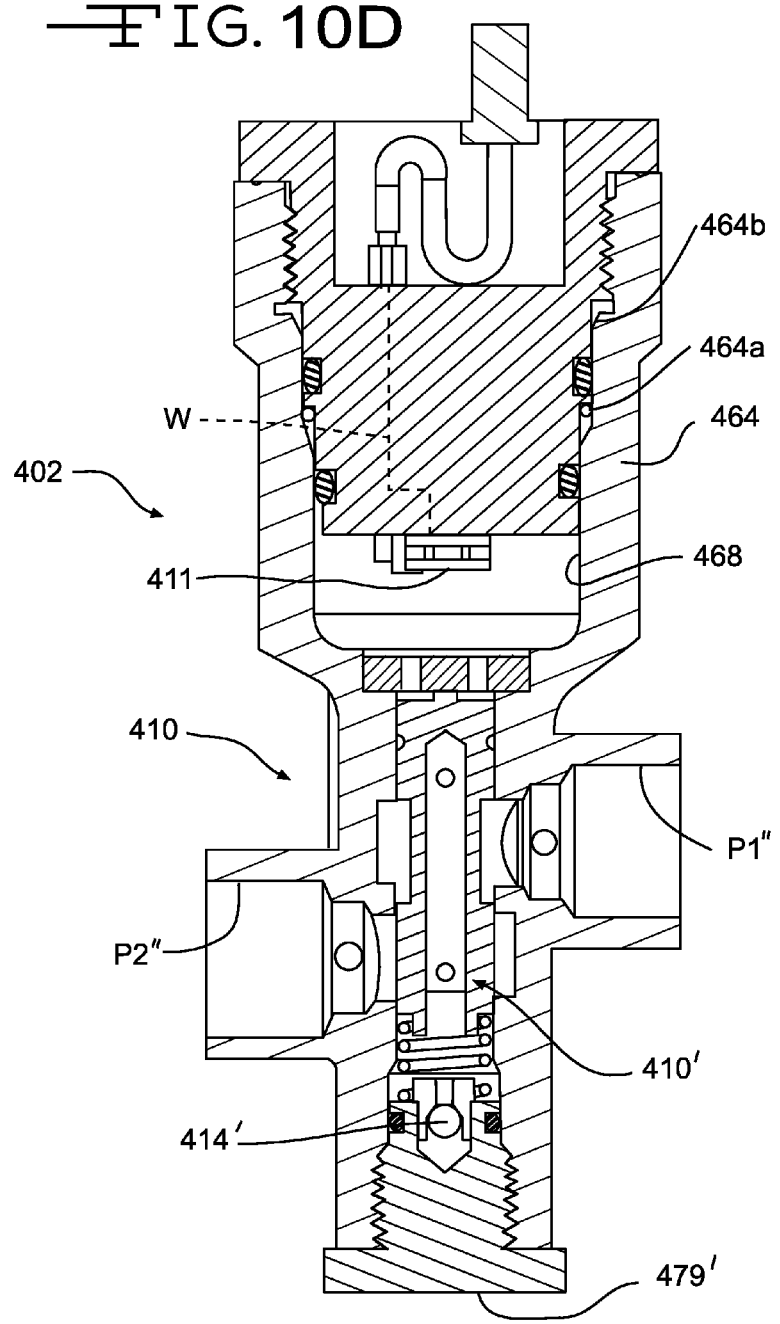

CONTROL ELEMENT AND CHECK VALVE ASSEMBLY

BACKGROUND OF THE INVENTION

This invention relates in general to valves for controlling fluid flow and more particularly, to a fluid flow control assembly for controlling flow of a fluid, such as a refrigerant, in a first direction of flow, and permitting substantially unrestricted flow of the fluid in a second direction of flow.

Valves are widely used for controlling the flow of a fluid from a source of pressurized fluid to a load device or from a load device to a low-pressure reservoir. Frequently, a pump, a compressor, or other pressure-increasing device, is provided as the source of pressured fluid, typically operating to draw low-pressure fluid from the reservoir, mechanically acting on the fluid to increase the pressure of the fluid, and discharging the pressurized fluid. The flow of the fluid discharged from the pressure-increasing device is typically selectively controlled by a valve to control the operation of the load device.

One type of valve is a microvalve. A microvalve system is a MicroElectroMechanical System (MEMS) relating in general to semiconductor electromechanical devices.

MEMS are a class of systems that are physically small, having features or clearances with sizes in the micrometer range or smaller (i.e., smaller than about 10 microns). A MEMS device is a device that at least in part forms part of such a system. These systems have both electrical and mechanical components. The term "micromachining" is commonly understood to mean the production of three-dimensional structures and moving parts of MEMS devices.

MEMS originally used modified integrated circuit (computer chip) fabrication techniques (such as chemical etching) and materials (such as silicon semiconductor material) to micromachine these very small mechanical devices. Today there are many more micromachining techniques and materials available.

The term "MEMS device" as may be used in this application means a device that includes a micromachined component having features or clearances with sizes in the micrometer range, or smaller (i.e., smaller than about 10 microns). It should be noted that if components other than the micromachined component are included in the MEMS device, these other components may be micromachined components or standard sized (i.e., larger) components (also referred to as "macro-sized components"). Similarly, the term "microvalve" as may be used in this application means a valve having features or clearances with sizes in the micrometer range, or smaller (i.e., smaller than about 10 microns) and thus by definition is at least partially formed by micro machining. The term "microvalve device" as may be used in this application means a device that includes a microvalve, and that may include other components. It should be noted that if components other than a microvalve are included in the microvalve device, these other components may be micromachined components or macro-sized components (i.e., components larger than micromachined components).

Various microvalve devices have been proposed for controlling fluid flow within a fluid circuit. A typical microvalve device includes a displaceable member or control element movably supported by a body and operatively coupled to an actuator for movement between a closed position and a fully open position. When placed in the closed position, the control element blocks or closes a first fluid port that is placed in fluid communication with a second fluid port, thereby preventing fluid from flowing between the fluid ports. When the control element moves from the closed position to the fully open position, fluid is increasingly allowed to flow between the fluid ports.

One type of microvalve device is a direct acting microvalve that consists of a beam resiliently supported at one end in a housing to control the flow of a fluid between ports formed in the housing. In operation, an actuator forces the beam to bend about the supported end of the beam. As the beam bends, the ports in the microvalve housing are uncovered or covered (that is, progressively opened or closed) to control fluid flow through the ports, and thus through the microvalve. Such a direct acting microvalve may be used as a pilot valve to control the operation of a main valve such as a pilot operated spool valve in the form of a macro-sized valve or a microvalve.

Another type of microvalve device is a pilot operated microvalve. Typically, such a microvalve device includes a micro spool valve that is pilot operated by a microvalve of the type as described above. For example, U.S. Pat. Nos. 6,494,804; 6,540,203; 6,637,722; 6,694,998; 6,755,761; 6,845,962; and 6,994,115, the disclosures of which are incorporated herein by reference, disclose pilot operated microvalves and microvalves acting as pilot valves. One type of pilot operated microvalve is the micro spool valve. The micro spool valve typically consists of a micromachined spool disposed in a chamber formed in an intermediate layer of multilayer valve housing. Various ports through the layers of the housing provide fluid communication with the chamber. The micromachined spool is moveable in the chamber to selectively allow fluid communication though the chamber by blocking particular ports depending on the desired result. In operation, a balance of forces acting on the micromachined spool is varied to move the micromachined spool into a desired position. Typically, the balance of forces includes forces generated by differential pressure acting on the spool, which differential pressure is controlled by a pilot valve.

Microvalve devices have application in many fields for controlling the flow of fluids in systems such as hydraulic, pneumatic, and refrigerant systems, including the Heating, Ventilation, and Air Conditioning (HVAC) field. HVAC systems may include, without limitation, such systems as refrigeration systems, air conditioning systems, air handling systems, chilled water systems, etc. Many HVAC systems, including air conditioning and refrigeration systems operate by circulating a refrigerant fluid between a first heat exchanger (an evaporator), where the refrigerant fluid gains heat energy, and a second heat exchanger (a condenser), where heat energy in the refrigerant fluid is rejected from the HVAC system.

One type of HVAC system is the heat pump system (which may also be called a "heat pump type refrigeration cycle apparatus"), which provides the ability to reverse flow of refrigerant through portions of the HVAC system. Conventionally, in the heat pump type refrigeration cycle apparatus, an expansion valve is interposed between an outdoor heat exchanger and an indoor heat exchanger. In a cooling mode, a refrigerant from the outdoor heat exchanger is expanded by the expansion valve and guided to the indoor heat exchanger. In a heating mode, the refrigerant from the indoor heat exchanger is expanded by the expansion valve and guided to the outdoor heat exchanger. This allows the heat pump type refrigeration cycle apparatus operating in the cooling mode to act as an air conditioning system in the summer, cooling air that flows through a first heat exchanger by absorbing the heat from the air into a refrigerant pumped through the first heat exchanger. The refrigerant then flows to a second heat exchanger, where the heat gained by the refrigerant in the first heat exchanger is rejected. However, during the winter, when the heat pump type refrigeration cycle apparatus is operated in the heating mode, the flow of refrigerant between the first and second heat exchangers is reversed. Heat is absorbed into the refrigerant in the second heat exchanger, and the refrigerant flows to the first heat exchanger, where the heat is rejected from the refrigerant into the air flowing through the first heat exchanger, warming the air passing through the first heat exchanger.

In many heat pump type refrigeration cycle apparatuses, the expansion valve is provided at the outdoor heat exchanger (outdoor unit) side. In this case, the refrigerant expanded by the expansion valve flows into the indoor heat exchanger via a long pipeline. This is problematic, in that the expanded refrigerant is subject to pressure loss, and flow rate control by the single expansion valve is difficult. A similar problem exists, if the single expansion valve is provided at the indoor heat exchanger side; when flow is reversed, the expansion valve is not optimally placed for best control. Accordingly, some heat pump type refrigeration cycle apparatuses include two expansion valves, each one installed adjacent a respective one of the two heat exchangers. Only one of the two expansion valves is controlling flow at a time, depending on which one is optimally placed adjacent the appropriate heat exchanger for the current mode of operation, and the other is non-controlling. One problem that exists in such a system with two expansion valves is how to route refrigerant flow through the section of the system in which the non-controlling expansion valve is located.

One prior art method of dealing with this problem is illustrated in FIG. 1, in which a first expansion valve 10a is mounted on an outdoor unit 11, and a second expansion valve 10b is mounted on an indoor unit 12. As will be further explained below, a check valve 13 is mounted to allow flow to bypass the first expansion valve 10a when the first expansion valve 10a is the non-controlling expansion valve. Similarly, a check valve 15 is mounted to allow flow to bypass the second expansion valve 10b when the second expansion valve 10b is the non-controlling expansion valve. Further, an outdoor heat exchanger 20 is mounted on the outdoor unit 11, and an indoor heat exchanger 30 is mounted on the indoor unit 12. A flow path switching valve 40 and a compressor 50 may be mounted on the outdoor unit 11. The expansion valves 10a, 10b, the check valves 13, 15, the outdoor heat exchanger 20, the indoor heat exchanger 30, the flow path switching valve 40 and the compressor 50 are connected as shown in FIG. 1, and compose the heat pump type refrigeration cycle apparatus. Incidental components, such as an accumulator, a pressure sensor, a thermal sensor and the like, are not shown in FIG. 1.

The flow path switching valve 40 switches the flow path of the refrigeration cycle apparatus to a cooling mode or a heating mode. In the cooling mode, as indicated by a solid-line arrow in FIG. 1, the refrigerant compressed by the compressor 50 flows from the flow path switching valve 40 to the outdoor heat exchanger 20 (where the refrigerant gives off heat). Then, most or all of the refrigerant (as will be explained below) flows around the non-controlling first expansion valve 10a via the first check valve 13, and thence, via a pipeline 60 to the controlling second expansion valve 10b. Then, the refrigerant is expanded by this second expansion valve 10b and flows to the indoor heat exchanger 30 where heat is absorbed by the refrigerant, cooling the indoor space. The refrigerant then flows from the indoor heat exchanger 30 into the compressor 50 via the flow path switching valve 40. On the other hand, in the heating mode as indicated by a dashed-line arrow in FIG. 1, the refrigerant compressed by the compressor 50 flows from the flow path switching valve 40 into the indoor heat exchanger 30 (where the refrigerant gives off heat, warming the indoor space. Most or all of the refrigerant (as will be explained below) then flows around the non-controlling second expansion valve 10b via the second check valve 15, and thence, via the pipeline 60 to the first expansion valve 10a. The refrigerant is expanded by this first expansion valve 10a and then circulates to the outdoor heat exchanger 20 (where heat is absorbed into the refrigerant), the flow path switching valve 40, and the compressor 50. Accordingly, in the cooling mode, the outdoor heat exchanger 20 works as a condenser, and the indoor heat exchanger 30 works as an evaporator to cool a room interior. Further, in the heating mode, the outdoor heat exchanger 20 works as the evaporator, and the indoor heat exchanger 30 works as the condenser to heat the room interior.

When the expansion valves 10a, 10b are controlling flow, they are in a semi-closed state to control the flow rate of the refrigerant, and the entire refrigerant flowing through the pipeline 60 flows through the controlling expansion valve 10a, 10b. However, when the expansion valve 10a, 10b is non-controlling, most or all of the refrigerant flowing through the pipeline 60 bypasses the non-controlling expansion valve 10a, 10b via the associated check valve 13, 15. Only a minority (or perhaps none, depending upon the design of the expansion valve 10a, 10b) of the refrigerant flowing through the pipeline 60 will flow through a non-controlling expansion valve 10a, 10b. In some prior art designs, a first flow path exists through the expansion valve 10a, 10b when the expansion valve 10a, 10b is a non-controlling expansion valve. This first flow path passes a maximum flow rate of fluid through the expansion valve 10a, 10b in a direction opposite that in which fluid flows with the expansion valve 10a, 10b is a controlling expansion valve, which maximum flow rate through this first flow path is less than the flow rate through a second flow path through the associated check valve 13, 15 when expansion valve 10a, 10b is a non-controlling expansion valve. In other prior art designs, no flow path exists through the expansion valve 10a, 10b when the expansion valve 10a, 10b is a non-controlling expansion valve. In such case, the maximum flow rate through the non-controlling expansion valve 10a, 10b is zero, which again will be less than a second flow rate through the through the associated check valve 13, 15 when the expansion valve 10a, 10b is a non-controlling expansion valve.

SUMMARY OF THE INVENTION

This invention relates to an improved apparatus for controlling fluid flow in a system, such as, but not limited to, a HVAC system, and in particular to a heat pump type refrigeration cycle apparatus.

In one aspect, the apparatus may include a refrigerant expansion valve arrangement that includes a housing with a first and a second port for connection to an external fluid circuit. A first fluid passageway provides fluid communication between the first port and the second port, and a second fluid passageway provides a second path of fluid communication with the first port. A control element is positionable to one or more throttled positions for controlling fluid flow through the first fluid passageway from the first port to the second port, and positionable to a fully open position to permit free flow from the second port to the first port. A check valve in the second fluid passageway prevents fluid flow from the first port to the second port, and permits fluid flow through to the first port from the second port to the first port, thereby affecting the balance of forces acting on the control element such that the control element is urged toward the fully open position.

Various aspects of this invention will become apparent to those skilled in the art from the following detailed description of the preferred embodiment, when read in light of the accompanying drawings.

BRIEF DESCRIPTION OF THE DRAWINGS

FIG. 4 is a table showing relative pressures, temperatures, and liquid/gaseous phase conditions of refrigerant in the apparatus shown in FIG. 2.

FIG. 9 is a perspective view of a third embodiment of the novel valve arrangement illustrated in FIG. 3.

FIG. 9A is a front elevation view of the device of FIG. 9, as viewed along the line 9A.

FIG. 9B is a side elevation view of the device of FIG. 9, as viewed along the line 9B.

FIG. 10D is a sectional view of the device shown in FIG. 10C, taken along the line 10D-10D.

DETAILED DESCRIPTION OF THE PREFERRED EMBODIMENT

Preliminarily, it should be understood that in this description and in the claims, the use of the singular word "port", "aperture", "fluid conduit", "fluid passageway", or words of similar import, should be considered to include the possibility of multiple ports (apertures, fluid conduits, fluid passageways, etc.) with the same functionality attributed to the single port (apertures, fluid conduits, passageways, etc.) unless explicitly and definitely limited to the singular. Furthermore, the use of directional terms such as "left" and "right", "up", "down", "upper", "lower", "upward", "downward", and words of similar import, should be interpreted in the frame of reference of the figure(s) under discussion, and should not be interpreted as limitations on orientation during use or the scope of the claims. Also, note that as used herein, it is contemplated that the terms "throttled position" and "throttled positions" encompass positions of a valve in which the valve under discussion is fully closed as well as those in which the valve is partially closed.

Figure 1:
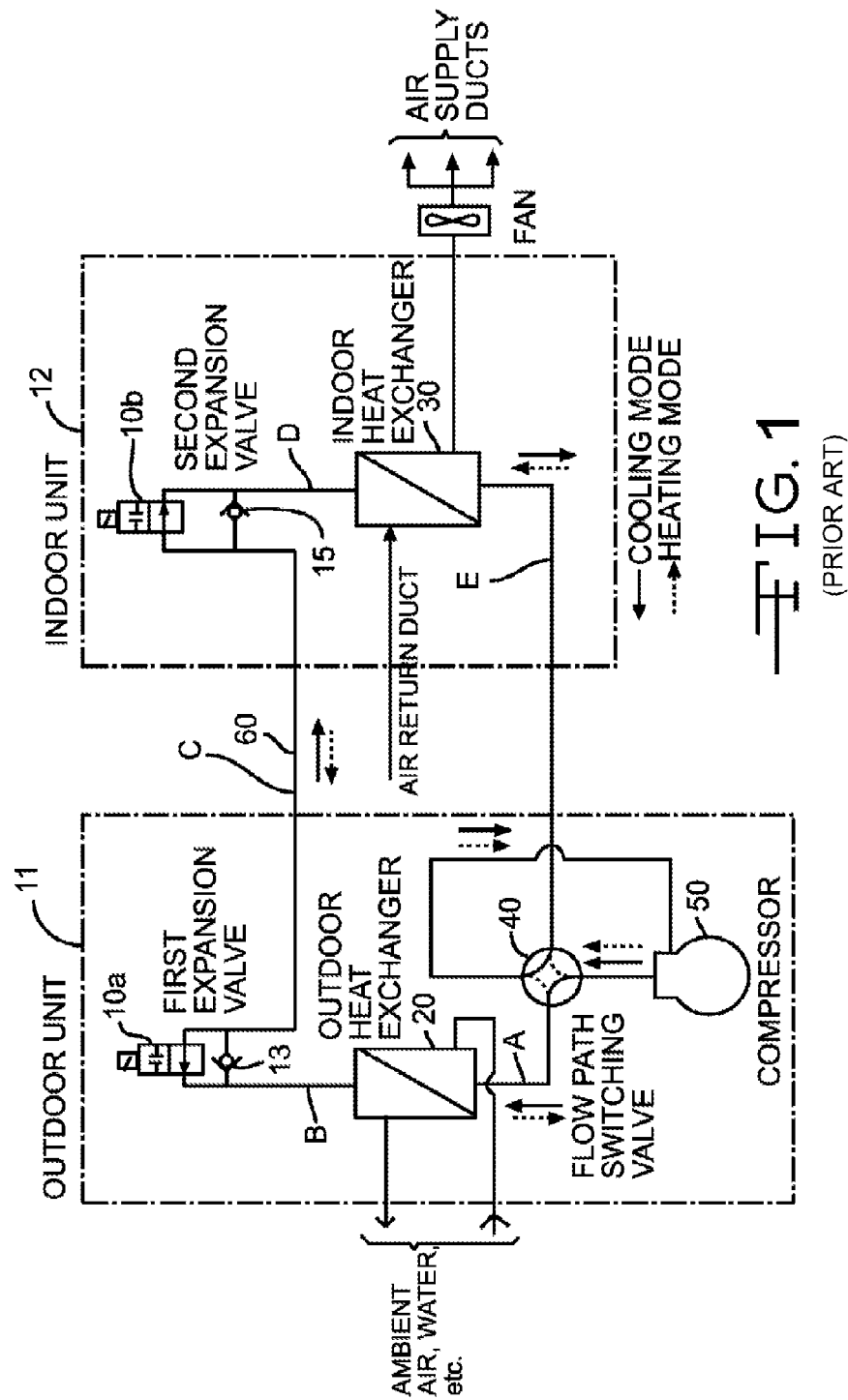
FIG. 1 is a schematic view showing a known heat pump type refrigeration cycle apparatus.
Figure 2:
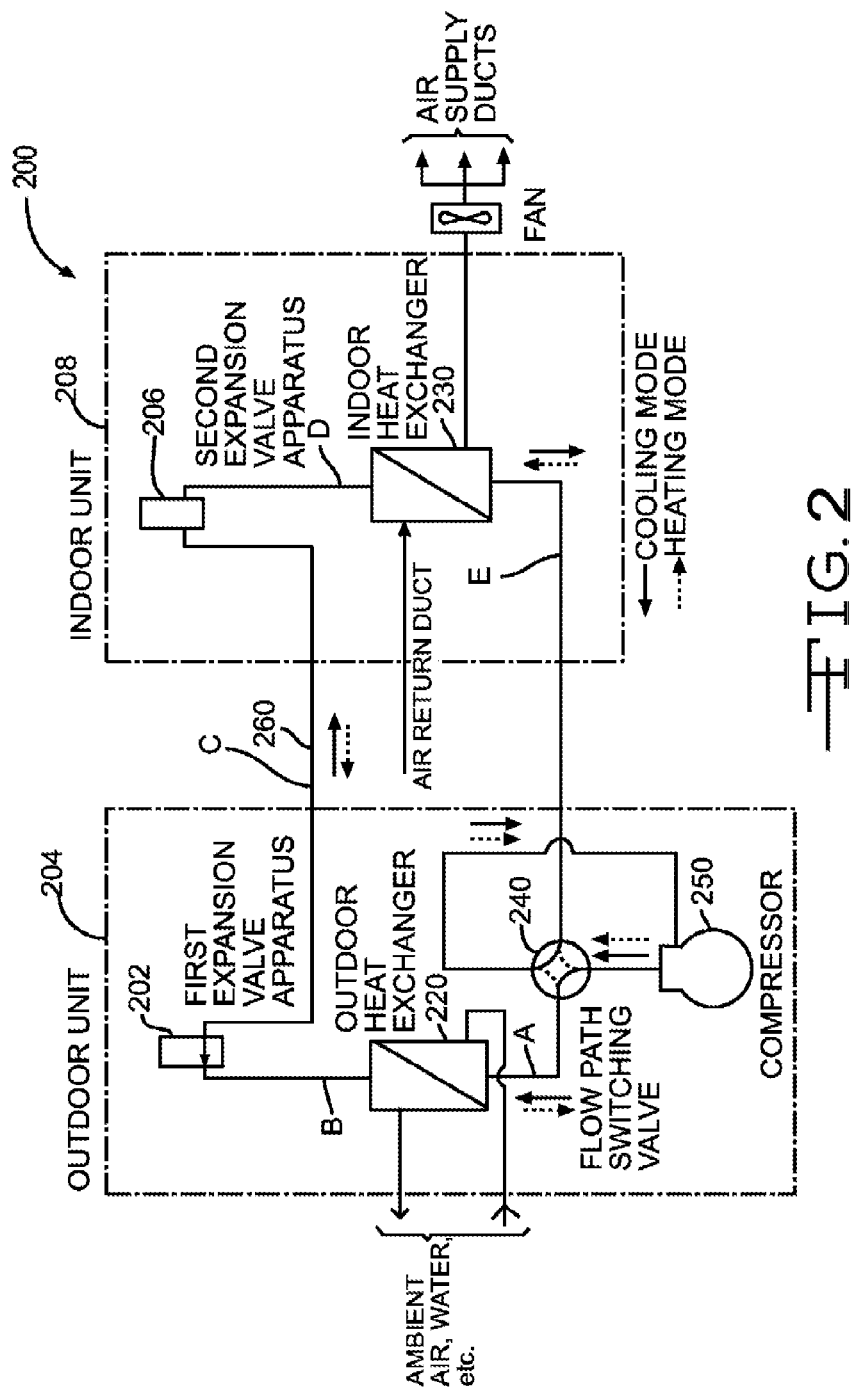
FIG. 2 is a schematic view similar to FIG. 1, but modified to incorporate a novel valve arrangement.

Referring now to the drawings, wherein like reference numbers and characters may represent like elements throughout all of the figures, there is illustrated in FIG. 2 a schematic view showing a first example of a system in which the invention may be practiced. Illustrated in FIG. 2 is a heat pump type refrigeration cycle apparatus 200. The heat pump type refrigeration cycle apparatus 200 may include a first expansion valve arrangement 202, which may be mounted on an outdoor unit 204, and a second expansion valve arrangement 206, which may be mounted on an indoor unit 208. The heat pump type refrigeration cycle apparatus 200 may be operated in a heating mode (extracting heat from an ambient external environment, and releasing the heat in a designated space to be warmed) or a cooling mode (extracting heat from a designated space to be cooled and rejecting the heat to an external ambient environment).

Figure 3:
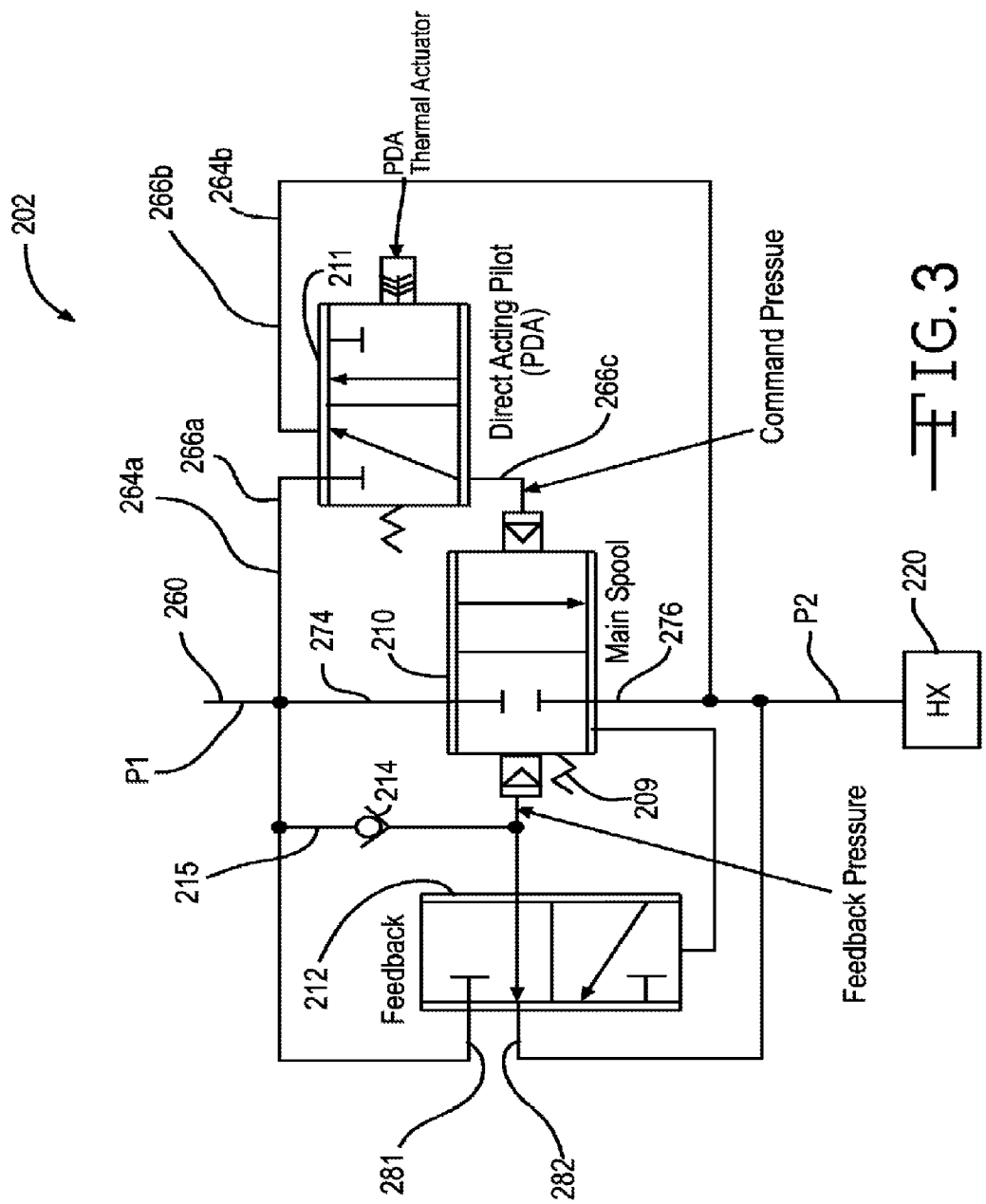
FIG. 3 is a schematic view illustrating the novel valve arrangement illustrated in FIG. 2, according to an aspect of the invention.

The first expansion valve arrangement 202 and the second expansion valve arrangement 206 are preferably similarly comprised of several components. Referring now to FIG. 3, a preferred embodiment of these several components is illustrated in schematic form. Each of the first expansion valve arrangement 202 and the second expansion valve arrangement 206, according to this preferred embodiment, will be comprised of a pilot operated main spool valve 210 which can act as a controlling expansion valve to control flow of refrigerant therethrough in a first direction, a pilot valve 211 providing a command pressure to the pilot operated main spool valve 210, a feedback valve 212 providing a feedback pressure to the pilot operated main spool valve 210, and a check valve 214 that operates, as will be explained below, to fully open the pilot operated main spool valve 210 to permit a majority of the refrigerant to flow in a reverse direction, opposite the first direction, through the pilot operated main spool valve 210 when the pilot operated main spool valve 210 is a non-controlling expansion valve. Various structures for implementing the first expansion valve arrangement 202 and the second expansion valve arrangement 206 illustrated in schematic form in FIG. 3 will be discussed below.

An outdoor heat exchanger 220 may be mounted on the outdoor unit 204, and an indoor heat exchanger 230 may be mounted on the indoor unit 208. A flow path switching valve 240 and a compressor 250 may be mounted on the outdoor unit 204. The expansion valves arrangements 202, 206, the outdoor heat exchanger 220, the indoor heat exchanger 230, the flow path switching valve 240 and the compressor 250 may be connected as shown in FIG. 2, and comprise the heat pump type refrigeration cycle apparatus 200. Incidental components, such as an accumulator, a pressure sensor, a thermal sensor and the like, are not shown in FIG. 2.

The flow path switching valve 240 switches the flow path of the refrigeration cycle apparatus to cause the heat pump type refrigeration cycle apparatus 200 to operate in either the cooling mode or the heating mode. In the cooling mode, the refrigerant flows in the direction indicated by a solid-line arrow in FIG. 2. More specifically, the refrigerant compressed by the compressor 250 flows from the flow path switching valve 240 to the outdoor heat exchanger 220 (where the refrigerant gives off heat), then most of the refrigerant (as will be explained below) flows through the fully open pilot operated main spool valve 210 of the non-controlling first expansion valve arrangement 202 and thence, via a pipeline 260, to the pilot operated main spool valve 210 in the controlling second expansion valve arrangement 206. The pilot operated main spool valve 210 in the controlling second expansion valve arrangement 206 will be controlling flow of refrigerant through the controlling second expansion valve arrangement, as will be further explained below. Thus, the pilot operated main spool valve 210 in the controlling second expansion valve arrangement 206 thus may be in any required position from fully open to fully closed. However, the pilot operated main spool valve 210 in the controlling second expansion valve arrangement 206 will normally operate in a range of intermediate positions between the fully open and fully closed positions during operation of the apparatus illustrated in FIG. 2. Then, the refrigerant is expanded by this second expansion valve arrangement 206 and flows to the indoor heat exchanger 230, where heat is absorbed by the refrigerant, cooling the indoor space. The refrigerant then flows from the indoor heat exchanger 230 and back into the compressor 250 via the flow path switching valve 240.

FIG. 4 is a table showing relative condition of the refrigerant in the system shown in FIG. 4 at five points in the system, in both the cooling mode described above, and a heating mode that will be described below. A first point, A, is between the flow path switching valve 240 and the outdoor heat exchanger 20. A second point, B, is between the outdoor heat exchanger 220 and the first expansion valve arrangement 202. A third point, C, is in the pipeline 260, between the first expansion valve arrangement 202 and the second expansion valve arrangement 206. A fourth point, D, is between the second expansion valve arrangement 206 and the indoor heat exchanger 230. A fifth point, E, is between the indoor heat exchanger 230 and the flow path switching valve 240. Reference to FIGS. 2 and 3 in conjunction with the description of operation in the cooling mode described above, and the heating mode described below, will assist in understanding the effect (if any) of the components of the heat pump type refrigeration cycle apparatus 200 on the refrigerant circulating in the heat pump type refrigeration cycle apparatus 200. Note that the table in FIG. 4 is intended to be a general illustration, rather than a precise quantitative illustration, and as such ignores small effects, such as head loss and heat loss in such components as the pipeline 260 or the path switching valve 240.

Now consider the heating mode of the heat pump type refrigeration cycle apparatus 200, where the refrigerant flows through the components thereof in a direction indicated by a dashed-line arrow in FIG. 2. The refrigerant compressed by the compressor 250 is discharged through the flow path switching valve 240 into the indoor heat exchanger 230 (where the refrigerant condenses, gives off heat and warming the indoor space). The refrigerant then flows through the non-controlling second expansion valve arrangement 206, with most of the refrigerant (as will be explained below) flowing through the fully open pilot operated main spool valve 210 of the non-controlling second expansion valve arrangement 206. Upon exiting the non-controlling second expansion valve arrangement 206, the refrigerant flows via the pipeline 260 to the first expansion valve arrangement 202, which in this mode of operation is the controlling expansion valve arrangement. There, the refrigerant is expanded by the pilot operated main spool valve 210 of the first expansion valve arrangement 202. The refrigerant then circulates to the outdoor heat exchanger 220 (where heat is absorbed into the refrigerant, which undergoes a phase change into a hot gas), through the flow path switching valve 240, and back to the compressor 250.

Accordingly, in the heating mode, the outdoor heat exchanger 220 works as an evaporator, and the indoor heat exchanger 230 works as a condenser to heat the room interior. In contrast, in the previously described cooling mode, the outdoor heat exchanger 220 works as a condenser, and the indoor heat exchanger 230 works as an evaporator to cool a room interior.

Referring again to FIG. 3, the structure and operation of the first expansion valve arrangement 202 and the second expansion valve arrangement 206 will be explained in further detail. FIG. 3 reflects a preferred arrangement in which the first expansion valve arrangement 202 and the second expansion valve arrangement 206 have the same structure and operation. Accordingly, while the description which follows refers to the first expansion valve arrangement 202, and the arrangement shown in FIG. 3 is labeled as the first expansion valve arrangement 202 it will be understood that the structure and operation of the second expansion valve arrangement 206 is preferably the same, and thus the structure and operation of the second expansion valve arrangement 206 need not be described separately.

The first expansion valve arrangement 202 has a connection, which may be in the form of a first connection port P1, to the pipeline 260 at the top of FIG. 3, which will be the high-pressure side when the illustrated pilot operated main spool valve 210 is the controlling expansion valve, i.e., during the heating mode. The first expansion valve arrangement 202 has a connection, which may be in the form of a second connection port P2, to the outdoor heat exchanger 220 at the bottom of FIG. 3, which will be the low-pressure side of the first expansion valve arrangement 202 when the first expansion valve arrangement 202 is the controlling expansion valve. When the system flow is reversed (when the heat pump type refrigeration cycle apparatus 200 is operating in the cooling mode), the top of the first expansion valve arrangement 202 (as seen in FIG. 3) will be the low-pressure/flow-out side, and the bottom will be the high-pressure/flow-in side.

The pilot operated main spool valve 210 operates by balancing three primary forces. The first is the force developed by a control pressure from the pilot valve 211. The pilot valve 211 is preferably an electrically actuated proportional MEMS silicon valve (which may be in the form of a direct-acting Ventilum® chip available from DunAn Microstaq of Austin, Tex.), but the pilot 211 could be any valve suitable to a particular application. The pilot valve 211 thus may suitably be a microvalve or a macro-sized valve. The pilot valve 211 may receive an electrical signal, and provides a command pressure to the pilot operated main spool valve 210, which command pressure preferably varies proportionally to the signal received by the pilot valve 211. The pilot valve 211 is connected to the high-pressure and low-pressure sides of the first expansion valve arrangement 202, and by selectively varying fluid communication with these connections, is able to raise and lower command pressure supplied to the pilot operated main spool valve 210. The control pressure acts against a first axial end 261 of a spool 210' of the pilot operated main spool valve 210, such that increasing control pressure tends to open the pilot operated main spool valve

210. Note that the spool 210' (as is also the case with the spools 310' and 410' which will further discussed below) may be more generically referred to as a control element of the associated valve, i.e., of the pilot operated main spool valve 210.

Note that both the pilot valve 211 and the pilot operated main spool valve 210 are preferably proportional valves whose position is proportional to a signal. In a preferred embodiment, this signal can take the form of an electrical signal supplied to the pilot valve 211 and a hydraulic signal in the form of fluid at a command pressure supplied to the pilot operated main spool valve 210. Further note that both the pilot valve 211, and the pilot operated main spool valve 210 are preferably designed to be stopped in an intermediate position to throttle the flow of fluid through them.

The second primary force acting on the pilot operated main spool valve 210 is the forced exerted by a spring 209, which spring 209 urges the pilot operated main spool valve 210 toward a closed position. The spring force of the spring 209 may be relatively small compared to the other two forces acting on the pilot operated main spool valve 210, and can normally be ignored, except when the other two forces are essentially equal.

The third primary force acting on the pilot operated main spool valve 210 is a feedback force, developed by a feedback pressure proportionate to outlet pressure which acts against a second axial end 262, opposite the first axial end 261, of the spool 210' of the pilot operated main spool valve 210, such that increasing feedback pressure tends to close the pilot operated main spool valve 210.

In a preferred embodiment, the pilot operated main spool valve 210 may be embodied as a spool valve having two flow paths therethrough: a main flow path through which most of the refrigerant flows and a "parallel" feedback flow path developing a variable feedback pressure based on the physical position of the pilot operated main spool valve 210. Such a parallel flow path arrangement through a spool valve is described in the International Application published under the Patent Cooperation Treaty (PCT) having International Publication Number WO 2008/121365, the disclosure of which is incorporated herein by reference. The action of blocking and unblocking this separate feedback flow path into and out of the pilot operated main spool valve 210 is depicted schematically in FIG. 3 as a separate feedback valve 212. However, physically the feedback valve 212 is preferably just a second flow path through the pilot operated main spool valve 210. The feedback valve 212 is in fluid communication with the second axial end 262 of the pilot operated main spool valve 210, the pipeline 260, and the connection to the outdoor heat exchanger 220. The feedback valve 212 increases fluid communication between the pipeline 260 and the second axial end 262 the more the pilot operated main spool valve 210 is moved to open the main flow path therethrough, and simultaneously may decrease fluid communication between the second axial end 262 and the connection to the outdoor heat exchanger 220. The feedback valve 212 may decrease fluid communication between the pipeline 260 and the second axial end 262 the more the pilot operated main spool valve 210 is moved to close the main flow path therethrough, and simultaneously increases fluid communication between the second axial end 262 and the connection to the outdoor heat exchanger 220. Thus, the feedback pressure preferably varies with the position of the pilot operated main spool valve 210 so that the pilot operated main spool valve 210 moves with the pilot valve 211, replicating the linear motion. The pilot operated main spool valve 210 thus varies directly with the position of the pilot. The spool feedback pressure acts in opposition to the command pressure, and the balance of forces developed by the feedback pressure the command pressure and the spring force of the spring 209 determines the position of the pilot operated main spool valve 210. In normal operation, if there is no power signal supplied to the pilot valve 211, the command pressure will be zero, the feedback pressure will be zero, and the spring 209 will urge the pilot operated main spool valve 210 toward the closed position thereof, that is, the position in which the main flow path through the pilot operated main spool valve 210 is closed.

Besides the pilot valve 211 and the pilot operated main spool valve 210, there is another valve in the first expansion valve arrangement 202, which is the check valve 214. The check valve 214 is disposed in a fluid conduit 215 in fluid communication between the pipeline 260 and the fluid at feedback pressure acting on the second axial end 262 of the pilot operated main spool valve 210. The check valve 214 only permits fluid flow through the fluid conduit 215 in a direction toward the pipeline 260. In normal operation, the check valve 214 remains closed when the pilot operated main spool valve 210 is the controlling expansion valve, because the pressure in the pipeline 260 will be greater than the feedback pressure at the other end of the fluid conduit 215.

In operation, when the heat pump type refrigeration cycle apparatus 200 is operating in the heating mode and the pilot operated main spool valve 210 is the "controlling" expansion valve, to increase refrigerant flow through the pilot operated main spool valve 210, the pilot valve 211 is actuated to pass high-pressure fluid from the pipeline 260 through the pilot valve 211 to increase command pressure at the command port of the pilot operated main spool valve 210, which urges the pilot operated main spool valve 210 to open. This causes pressure on the outlet side of the first expansion valve arrangement 202 (connected to the outdoor heat exchanger 220) to increase; this pressure increase is fed back to the second axial end 262 of the pilot operated main spool valve 210 to counter the command pressure, allowing the pilot operated main spool valve 210 to stabilize at a new, more fully open position. To decrease flow of refrigerant through the pilot operated main spool valve 210, positioning the pilot valve 211 to vent some of the control pressure to the low-pressure side of the first expansion valve arrangement 202 creates a pressure imbalance across the spool 210' of the pilot operated main spool valve 210 that tends to cause the pilot operated main spool valve 210 to shut until outlet pressure being fed back to the second axial end 262 of the spool 210' of the pilot operated main spool valve 210 reduces to a new equilibrium level with the reduced command pressure.

When the heat pump type refrigeration cycle apparatus 200 is operating in the cooling mode, the flow path switching valve 240 has changed position so that system flow is reversed from that described in the previous paragraph. As indicated above, when the heat pump type refrigeration cycle apparatus 200 is operating in the cooling mode, the top of the first expansion valve arrangement 202 (as seen in FIG. 3) connected to the pipeline 260 will be the low-pressure/flow-out side, the bottom of the first expansion valve arrangement 202 will be the high-pressure/flow-in side, and the pilot operated main spool valve 210 becomes the off-line, non-controlling expansion valve. The pilot valve 211 is turned off (the control signal to the pilot valve 211 is reduced to zero), allowing the pilot valve 211 to move to the position illustrated in FIG. 3, so that high pressure from the bottom of the first expansion valve arrangement 202 is directed via the pilot valve 211 to increase command pressure to the same high pressure, which pressure acts on the first axial end 261 of the pilot operated main spool valve 210, tending to open the pilot operated main spool valve

210. However, high-pressure fluid from the bottom of the arrangement is also directed through the feedback valve 212 to the second axial end 262 of the spool 210' of the pilot operated main spool valve 210, counteracting the force from the control pressure. Since the force developed by the feedback pressure acts in the same direction as the force exerted by the spring 209, this would tend to cause the pilot operated main spool valve 210 to go shut but for the fact that the high pressure in the feedback chamber 280 acting on the spool 210' also acts on the check valve 214.

The check valve 214, with high pressure on the bottom side of the check valve 214 (as viewed in FIG. 3) and low pressure on the top side of the check valve 214, opens up, thereby bleeding off at least some of the high pressure fluid being supplied to the feedback chamber through the feedback bore 267a of the pilot operated main spool valve 210. This lowers pressure in the feedback chamber 280 sufficiently that the high pressure applied to the command chamber 278 overcomes the combined forces of the spring and the force developed by the lower pressure in the feedback chamber 280 to urge the pilot operated main spool valve 210 full open. Fully opening the main spool valve 210 permits unrestricted system flow to pass through the pilot operated main spool valve 210 from the second connection port P2 to the first connection port P1, i.e., in a direction reverse of that which occurs when the pilot operated main spool valve 210 is the controlling expansion valve. The check valve 214 does not have to be so large that it could pass full system flow or even the majority of refrigerant passing through the first expansion valve arrangement 202. The check valve 214 only needs to pass a very small amount of flow to the pipeline 260 to lower pressure sufficiently that the sum of spring force from the spring 209 and the feedback pressure force acting on the second axial end 262 of the spool 210' of the pilot operated main spool valve 210 is less than the control pressure force acting in the opposite direction on the first axial end 261 of the pilot operated main spool valve 210, causing the pilot operated main spool valve 210 to open fully when the pilot operated main spool valve 210 is not the controlling expansion valve.

Fully opened, the pilot operated main spool valve 210 can pass a majority of the refrigerant passing through the first expansion valve arrangement 202 when the heat pump type refrigeration cycle apparatus 200 is operating in the cooling mode. Preferably, the spring 209 is designed to provide a relatively weak closing force, so that a relatively small check valve 214 may be utilized, and only a minority of the refrigerant passing through the first expansion valve arrangement 202 need pass through the check valve 214 to sufficiently lower the feedback pressure to allow the pilot operated main spool valve 210 to open fully when the pilot operated main spool valve 210 is not the controlling expansion valve.

Figure 5:
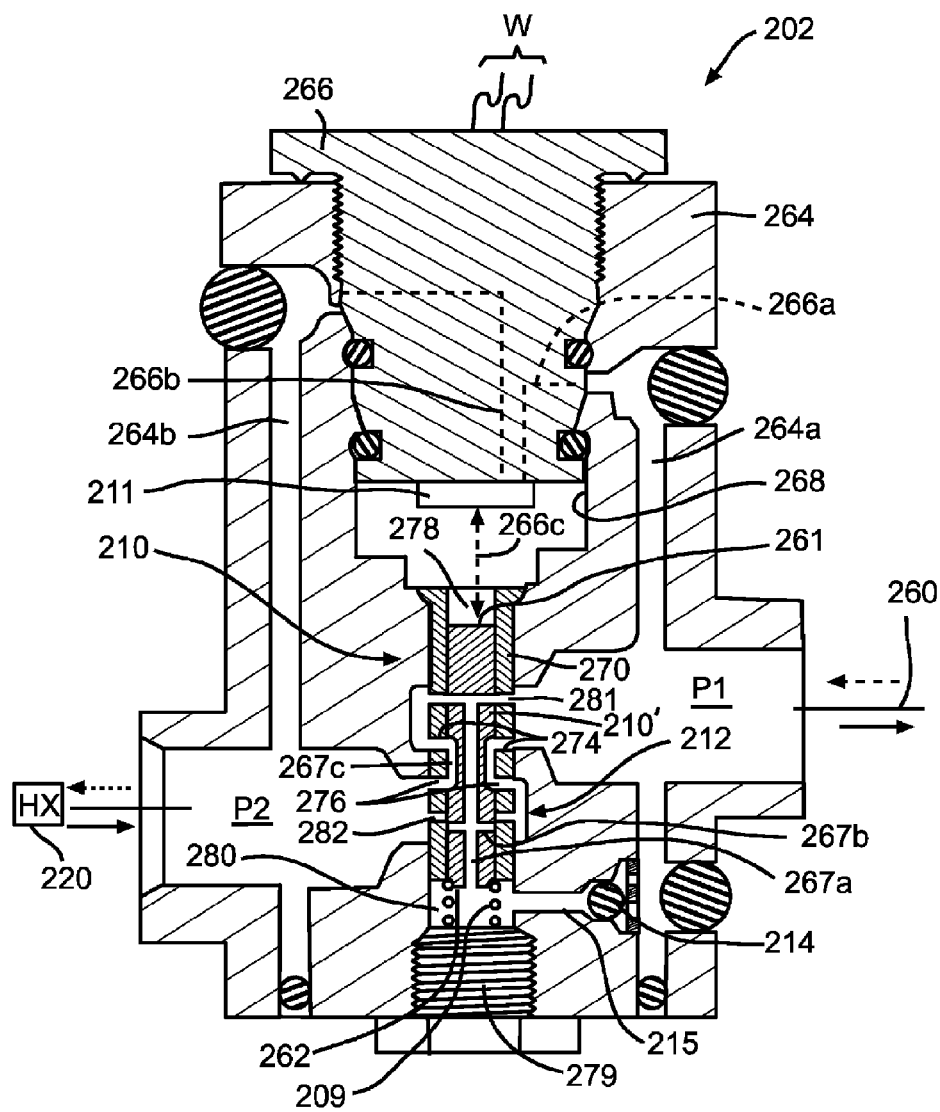
FIG. 5 is a cross-sectional view of a first embodiment of the novel valve arrangement illustrated in FIG. 3 shown in an open position.

FIG. 5 is a cross-sectional view of a first embodiment of the novel first expansion valve arrangement 202 illustrated in FIG. 4. The pilot operated main spool valve 210 is illustrated disposed in a block valve housing 264, although such is not required. The pilot operated main spool valve 210 may be placed in any suitable environment. The valve housing 264 may include two connection ports for connecting the first expansion valve arrangement 202 to the rest of the heat pump type refrigeration cycle apparatus 200: A first connection port P1 which may be connected to the pipeline 260, and a second connection port P2 which may be connected to piping providing fluid communication with the outdoor heat exchanger 220.

Figure 6:
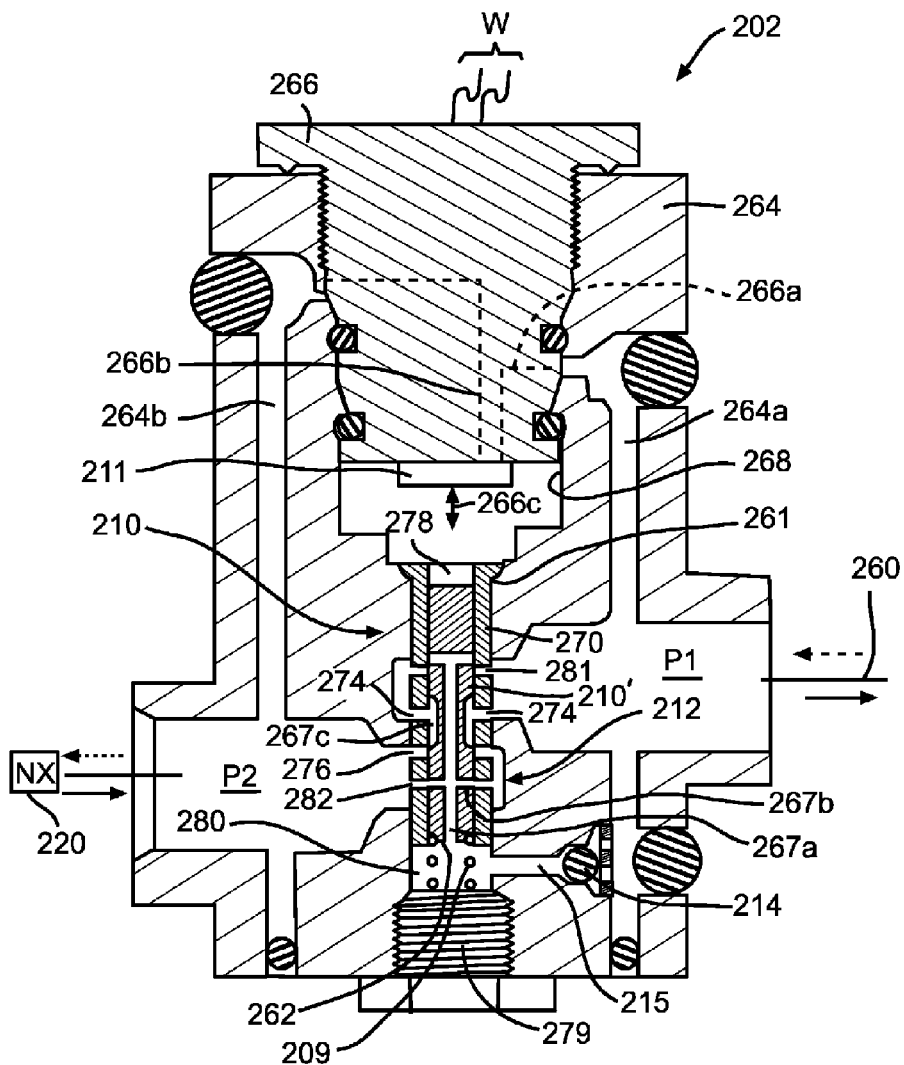
FIG. 6 is a view similar to FIG. 5, showing the novel valve arrangement in a closed position.

The pilot valve 211 is secured to the valve housing 264 via a mounting structure 266, as best shown in FIGS. 5 and 6, although such is not required. It must be understood that the pilot valve 211 may be suitably arranged anywhere physically possible in any manner in the first expansion valve arrangement 202. The mounting structure 266 may additionally function as a plug that seals an end of a stepped bore 268 formed in the valve housing 264. In a preferred embodiment, the pilot valve 211 is an open center 3-way valve, most preferably embodied as a microvalve. The mounting structure 266 may define a first passageway 266a for connecting the pilot valve 211 to the first connection port P1, and a second passageway 266b for connecting the pilot valve 211 to the second connection port P2. As noted above, the pilot valve 211 may be suitably arranged anywhere physically possible. In the embodiment illustrated on FIGS. 5 and 6, the pilot valve 211 is physically mounted on an inner axial end of the mounting structure 266, so that a third passageway 266c for connecting the pilot valve 211 to apply command pressure to the first axial end 261 of the spool 210' may be embodied simply as a port in the pilot valve 211 in fluid communication with a chamber communicating with the first axial end 261 of the spool 210'. Indeed, the pilot valve 211 may be disposed within the chamber communicating with the first axial end 261 of the spool 210'. Thus, the pilot valve 211 in the embodiment illustrated in FIGS. 5 and 6 may be of a flow-through design, with fluid connection ports on both the top and bottom (as viewed in FIGS. 5 and 6) faces thereof. Note that the pilot valve 211 could alternatively be formed differently, such as with all fluid connection ports being formed in the upper face (as viewed in FIGS. 5 and 6), and the third passageway 266c being formed in the mounting structure 266 to connect the pilot valve 211 to apply command pressure to the first axial end 261 of the spool 210'. Further note that the mounting structure 266 may alternatively be disposed elsewhere on the valve housing 264, and a separate plug provided to seal the end of the stepped bore 268.

The valve housing 264 may include a variety of passageways and ports for connecting different portions of the first expansion valve arrangement 202 to other portions of the heat pump type refrigeration cycle apparatus 200 or with each other. For example, a first passageway 264a may provide fluid communication between the first passageway 266a and the first connection port P1, and a second passageway 264b may provide fluid communication between the second passageway 266b and the second connection port P2. The passageways and ports may be formed in the valve housing 264 by any suitable method, such as by drilling, and by pressing in balls to seal portions of drilled passageways in a known manner.

As best shown in FIG. 5, the pilot operated main spool valve 210 includes the spool 210'. The spool 210' has a feedback bore 267a extending longitudinally inwardly from the second axial end 262. The spool 210' defines a plurality of radial ports 267b that communicate with the feedback bore 267a. The spool 210' further defines a circumferentially extending groove 267c.

The spool 210' may be disposed within a sleeve 270 fixed within the bore 268 formed in the valve housing 264. The sleeve 270 includes a plurality of primary flow ports, including first primary ports 274 and second primary ports 276. Note that fabrication of the pilot operated main spool valve 210 utilizing the sleeve 270 has various advantages and disadvantages, and it is fully comprehended that the pilot operated main spool valve 210 may suitable be fabricated without utilizing a sleeve 270 and directly machining ports in the valve housing 264, as will be seen with respect to a third embodiment illustrated in FIGS. 9 through 9C.

The sleeve 270, the spool 210', the valve body 264, and the mounting structure 266 may cooperate to define a variable-volume command chamber 278 between the first axial end 261 of the spool 210' and the mounting structure 266. The third passageway 266c communicates with the command chamber 278 to provide fluid communication of the command pressure from the pilot valve 211 to the first axial end 261 of the spool 210'.

As described above, the mounting structure 266 seals an end of the stepped bore 268. A threaded plug 279 may be provided to seal a second end of the stepped bore 268. The sleeve 270, the spool 210', and the plug 279 may cooperate to define, within the sleeve 270, a variable volume feedback chamber 280 between the second axial end 262 of the spool 210' and the plug 279. The feedback bore 267a in the spool 210' communicates with the feedback chamber 280 to provide fluid communication of the feedback pressure from the feedback valve 212 to the second axial end 262 of the spool 210'.

The spring 209 may be disposed in the feedback chamber 280, compressed between the plug 279 and the second axial end 262 of the spool 210', and acting to urge the spool 210' to move upwardly (as seen in FIG. 5) toward the fully closed position of the pilot operated main spool valve 210.

When operating in the heating mode, when the spool 210' is moved so that the groove 267c is in fluid communication both the first primary ports 274 and the second primary ports 276, as illustrated in FIG. 5, at least the majority of all of the refrigerant flowing through the first expansion valve arrangement 202 enters through the first connection port P1 and then through the first primary ports 274 defined in the sleeve 270, flows through the groove 267c in the spool 210', and exits via the second primary ports 276 defined in the sleeve 270 and then the second connection port P2. When operating in the cooling mode, the direction of refrigerant flow along this path between the first connection port P1 and the second connection port P2 is reversed. The pilot operated main spool valve 210 is in the most open position thereof when the cross sectional flow area of between the groove 267c and the first primary ports 274 is at a maximum and equal to the cross sectional flow area of between the groove 267c and the second primary ports 276. As command pressure is reduced by the pilot valve 211, the spool 210' moves upward (as viewed in FIG. 5), progressively reducing the cross-sectional flow area between the second primary ports 276 and the groove 267c, closing the pilot operated main spool valve 210 (as seen in FIG. 6).

The sleeve 270 also defines at least one first reference port 281 and one second reference port 282. When operating in the heating mode, so that the pilot operated main spool valve 210 is the controlling expansion valve, a portion of the refrigerant flowing through the first expansion valve arrangement 202 may flow through the "parallel" feedback flow path from the first connection port P1, through the first reference port 281 defined in the sleeve 270, through the radial ports 267b, and into the feedback bore 267a. The pressure in the feedback bore 267a, which is the feedback pressure, is communicated via the feedback bore 267a to the feedback chamber 280, and acts against the second axial end 261 of the spool 210'. The parallel feedback flow path further extends through others of the radial ports 267b to flow through the second reference port 282 and out of the first expansion valve arrangement 202 through the second connection port P2.

Note that when command pressure acting on the first axial end 261 is at a maximum, moving the pilot operated main spool valve 210 to the fully open position thereof (shown in FIG. 5), high-pressure fluid (refrigerant) from the first connection port P1 is able to pass through the first reference port 281, the associated radial ports 267b, and enter into the feedback bore 267a. However (as also shown in FIG. 5), in this position, the radial ports 267b in the spool 210' associated with the second reference ports 282 are displaced from the second reference ports 282. Thus, the pressure in the feedback bore 267a does not bleed off to the low-pressure region in the second connection port P2, and the feedback pressure in the feedback bore 267a and the feedback chamber 280 reaches a maximum pressure. This maximum feedback pressure acts on and applies a force to the second axial end 262 of the spool 210', which, when added to the force exerted by the spring 209, is substantially equal to and opposite in direction to the force acting on the spool 210' developed by the command pressure.

If command pressure is reduced by the pilot valve 211, the forces acting on the spool 210' will be unbalanced, tending to move the spool 210' toward the closed position thereof (upward as viewed in FIG. 5, toward the closed position shown in FIG. 6). As the spool 210' moves in this fashion, the cross-sectional flow area between the second reference port 282 and the associated radial port 267b communicating with the feedback bore 267a increases, causing feedback pressure to decrease.

Note that the increasing and decreasing of fluid communication between the second reference port 282 and the associated radial port 267b is represented by the feedback valve 212 in FIG. 3. Since, in the embodiment shown in FIG. 5, the feedback valve 212 and the pilot operated main spool valve 210 are each operated by movement of the spool 210', and thus act simultaneously to control flow through the feedback flow path and the main flow path, respectively, through the first expansion valve arrangement 202. If the command pressure is delivered at a non-zero pressure less than maximum pressure, the spool 210' will move to a position where both the first reference port 281 and the second reference port 282 are partially open, and refrigerant will flow through the feedback bore 267a in the spool 210' from the first reference port 281 to the second reference port 282. The feedback pressure in the feedback bore 267a will be a pressure intermediate the pressures at the first connection port P1 and the second connection port P2, and the forces exerted by the spring 209, the feedback pressure, and the command pressure achieve equilibrium with the spool 210' at a position between full open and full shut proportional to the command pressure.

Also shown in FIG. 5 is the fluid conduit 215 providing fluid communication between the feedback chamber 280 and the first connection port P1. During the heating mode of operation of the heat pump type refrigeration cycle apparatus 200, the fluid pressure in the first connection port P1 is as high or higher than the fluid pressure in the feedback chamber 280, so the check valve 214 will not open.

When switching between modes of operation of the heat pump type refrigeration cycle apparatus, the system is shut down as an intermediate step; the compressor 250 and the pilot valve 211 are deenergized, causing the pilot valve 211 to move into the position shown in FIG. 3. Command pressure will be zero, and the sprint 209 will move the spool 210' of the pilot operated main spool valve 210 to the closed position thereof, shown in FIGS. 3 and 6. The feedback valve 212 will be positioned such that the first reference port 281 is blocked and the second reference port is unblocked. Thus, the feedback chamber 280 will be in fluid communication with the second connection port P2, and blocked from communication with the first connection port P1.

When the heat pump type refrigeration cycle apparatus 200 is subsequently started up in the cooling mode of operation, it is believed to be desirable to leave the pilot valve 211 deenergized in order to reduce energy needs of the heat pump type refrigeration cycle apparatus 200. Since the pilot operated main spool valve 210 is already sufficiently large to handle the majority of system flow therethrough when the pilot operated main spool valve 210 is the controlling expansion valve, it is also believed to be desirable to fully open the pilot operated main spool valve 210 to permit at least a majority of system flow to pass therethrough, and thus avoid the need for providing other components of large enough size to accommodate a majority of system flow when the pilot operated main spool valve 210 is the non-controlling expansion valve.

Referring again to FIG. 3, when the heat pump type refrigeration cycle apparatus 200 is subsequently started up in the cooling mode of operation, the flow through the first expansion valve arrangement 202 is reversed, and the pressure in the second connection port P2 will be higher than the pressure in the first connection port P1. With the pilot valve 211 remaining in the deenergized position, high-pressure refrigerant fluid will flow from the second connection port P2, through the second housing passageway 264b, through the second passageway 266b, through the pilot valve 211, through the third passageway 266c to the command chamber 278, raising command pressure, and tending to open the pilot operated main spool valve 210.

However, simultaneously, high-pressure refrigerant fluid will also flow from the second connection port P2, through the second reference port 282 of the feedback valve 212 into the feedback chamber 280. Absent other effects, the feedback pressure would equal the command pressure, generating equal and opposite forces on the spool 210'. Again, absent other effects, the spring 209 would also exert a force on the spool 210', which, when combined with the force generated by the feedback pressure would overcome the force generated by the command pressure, and keep the pilot operated main spool valve 210 in the closed position. However, there is another effect to consider, which is that when feedback pressure becomes greater than the pressure in the first connection port P1 (which is the downstream, low-pressure side of the first expansion valve arrangement 202 during the cooling mode of operation), the check valve 214 will open. Even a relatively small amount of fluid flow from the feedback chamber 280, through the check valve 214 and the fluid conduit 215, to the first connection port P1 will bleed off sufficient pressure in the feedback chamber that the force generated by the feedback pressure, even added to the force exerted by the spring 209, would be insufficient to overcome the force generated by the command pressure, and the pilot operated main spool valve 210 will move to the fully open position shown in FIG. 5.

Figure 7:
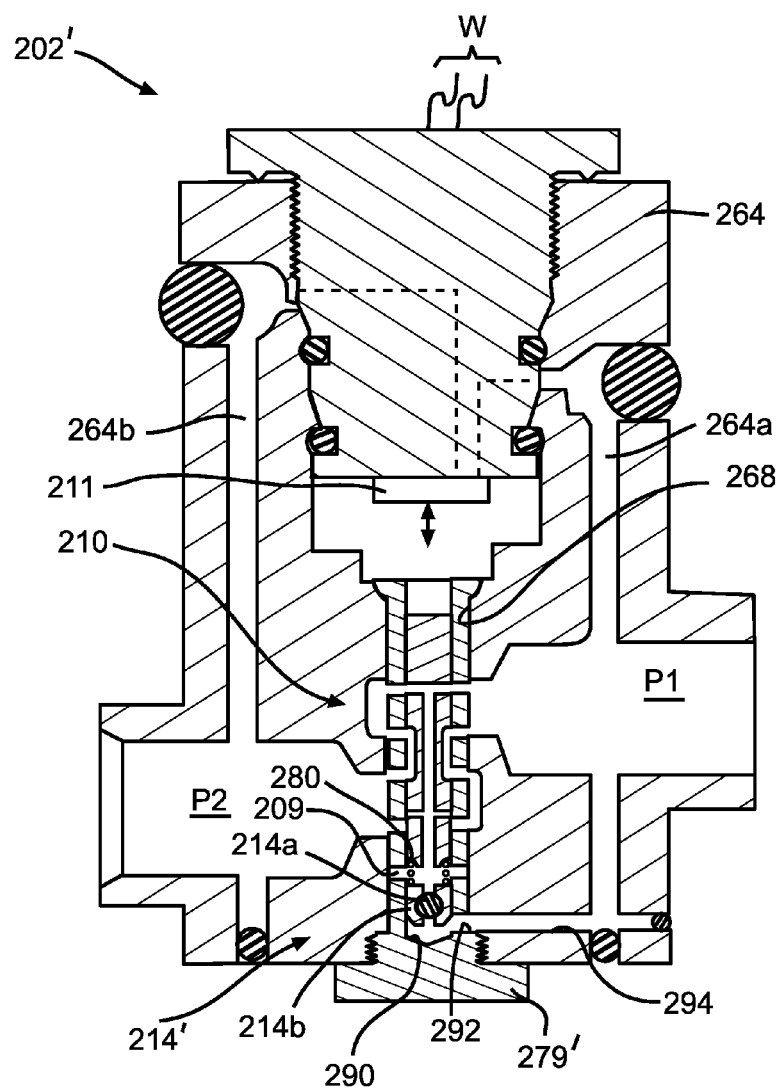
FIG. 7 is a view similar to FIG. 5, showing a second embodiment of the novel valve arrangement illustrated in FIG. 3.

FIG. 7 is a view similar to FIG. 5, showing a second embodiment of the novel expansion valve arrangement illustrated in FIG. 4, with the expansion valve arrangement of the second embodiment being generally indicated at 202'. The expansion valve arrangement 202' differs from the expansion valve arrangement 202 in that a check valve 214', similar in function to check valve 214 is disposed in a different physical location. As the other components of the expansion valve arrangement 202' may be generally identical to corresponding components of the expansion valve arrangement 202, the same reference numbers will be used for these other components, including the pilot operated main spool valve 210, the pilot valve 211, the passageway 264a providing fluid communication between the pilot valve 211 and the first connection port P1, and the passageway 264b providing fluid communication between the pilot valve 211 and the second connection port P2.

Figure 8:
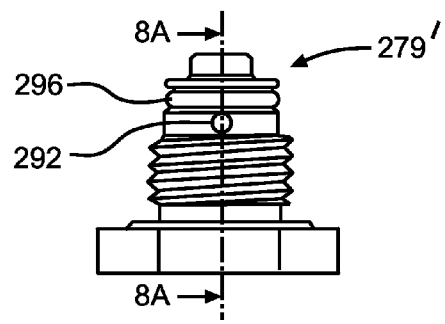
FIG. 8 in an enlarged side view of a check valve shown in FIG. 7.
Figure 8A:
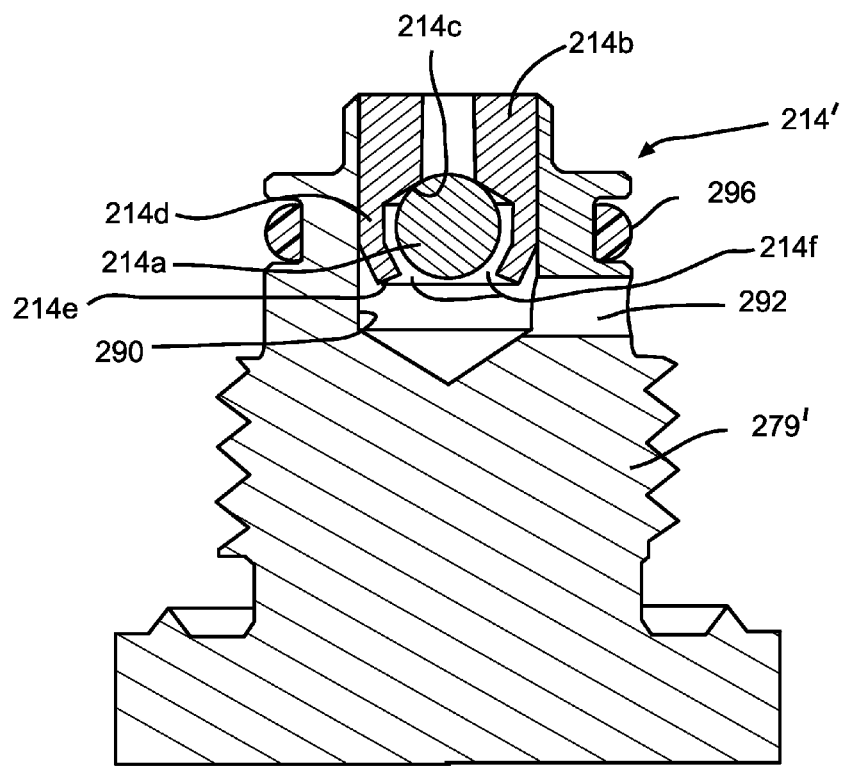
FIG. 8A is an enlarged sectional view of the check valve shown in FIG. 8, taken along the line 8A-8A.
Figure 8B:
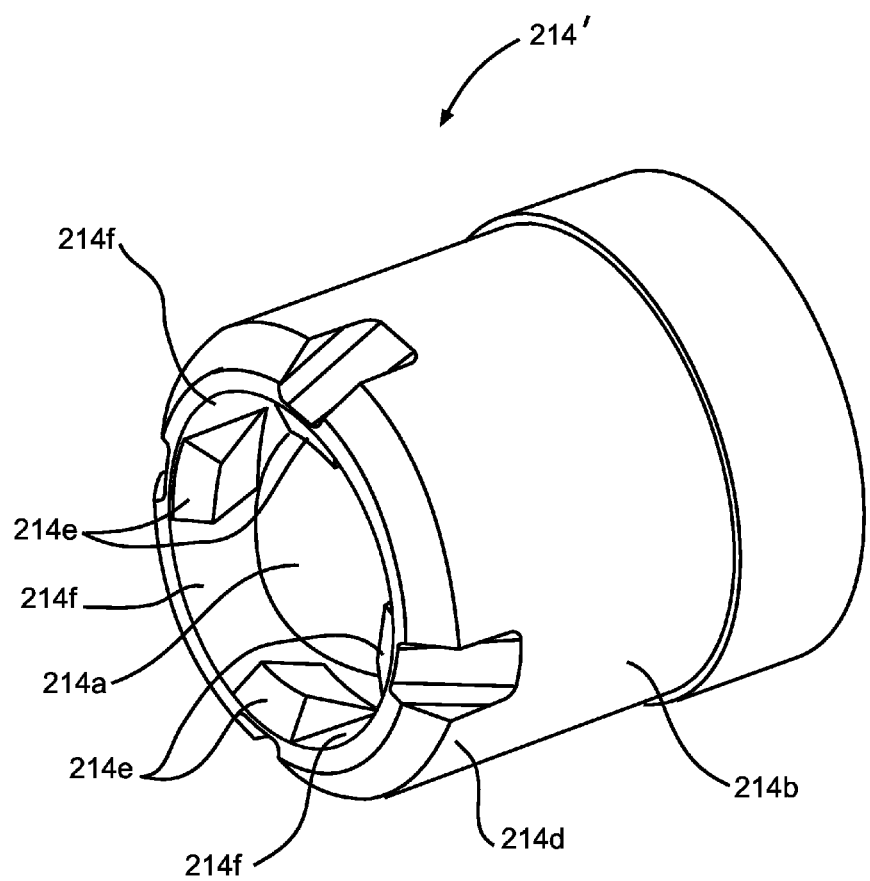
FIG. 8B is an enlarged perspective view of the check valve shown in FIG. 8A, but shown separate from the plug.

As shown in FIG. 7, and in enlarged views in FIGS. 8, 8A, and 8B, the check valve 214' has been relocated from the passageway 215 defined in the valve housing 264 of FIGS. 5 and 6. Instead, the check valve 214' has been incorporated into a plug 279'. The plug 279' may perform the same functions as the plug 279 described above, that is, sealing the second end of the stepped bore 268, cooperating with other components to define the boundaries of the feedback chamber 280, and acting as a surface supporting the spring 209. However, the plug 279' may further include a longitudinal bore 290 defined in the inner face of the plug 279'. A radial bore 292 communicates with the bore 290. When the plug 279' is fully inserted to seal the second end of the stepped bore 268, the radial bore 292 communicates with a passageway 294 defined in the valve housing 264 in fluid communication with the first connection port P1.

The check valve 214' is disposed in the bore 290 in a manner to prevent fluid flow through the check valve 214' from the first connection port P1 to the feedback chamber 280, but permitting fluid flow from the feedback chamber 280 through the check valve 214' to the first connection port P1. In a preferred embodiment, illustrated in FIGS. 7, 8, 8A, and 8B, the check valve 214' is comprised of a ball 214a and a seat 214b. The seat 214b is pressed into the bore 290, with a relatively leak tight seal between the outer surface of the seat 214b and the material of the valve plug 279' defining the bore 290. The seat 214b defines a seating surface 214c against which the ball 214a will seal when subjected to reverse flow through the check valve 214', and may define a skirt 214d that may be crimped inwardly to loosely retain the ball 214a in the region of the seat 214c, so that the ball 214a will be quickly carried by reverse fluid flow through the check valve 214' into sealing contact with the seating surface 214c. The skirt 214d may be provided with features to prevent the ball 214 from sealing against the skirt 214d during forward flow through the check valve 214' in a manner to prevent continued forward flow through the check valve 214'. Such features of the skirt 214d preventing the ball 214a from blocking forward flow through the check valve 214' may include grooves (not shown) formed in the skirt 214d, or perforations (not shown) formed through the skirt 214d, or bosses 214e formed on the skirt 214d. The illustrated bosses 214e are disposed at various locations on the inner surface of the skirt 214d and act to prevent the ball 214a from seating at other, inter-boss locations 214f formed on the inner surface of the skirt 214d during forward flow through the check valve 214', thus permitting fluid to flow through the check valve 214' between the ball 214a and the skirt 214d in such inter-boss locations 214f. The bosses 214e may be formed by crimping inwardly selected spaced-apart portions of the skirt 214d, as may be most clearly seen in FIG. 8B. Of course, there are other ways to form the bosses 214e on the skirt 214d, such as during a casting or machining process forming the skirt 214d. As described above, the skirt 214d may be crimped inwardly (either in selected locations to form the bosses 214e, or uniformly if an alternate method is used to provide a forward flow path through the check valve 214', such as perforations through the skirt 214d); such crimping retains the ball 214a with the seat 214b, which may facilitate handling of the seat 214b and ball 214a prior to being pressed into the bore 200, preventing the ball 214a from being separated from the seat 214b. An o-ring 296 may be provided to prevent leakage around the check valve 214' between the valve plug 279' and the valve housing 264.

As indicated above, the second expansion valve arrangement 206 may be identical in structure to the first expansion valve arrangement 202. However, the structure may be different, although preferably the function will be the same. For example, the first expansion valve arrangement 202 may take the structure of that illustrated in FIG. 5, while the second expansion valve arrangement 206 may take the structure illustrated in FIG. 7, both of which function as described and illustrated in FIG. 4. In further alternative arrangements, either or both the first expansion valve arrangement 202 and the second expansion valve arrangement 206 may take the structure of the third or fourth embodiments described below, or may suitably take on another structure that is within the range of structures claimed in the accompanying claims.

Figure 9C:
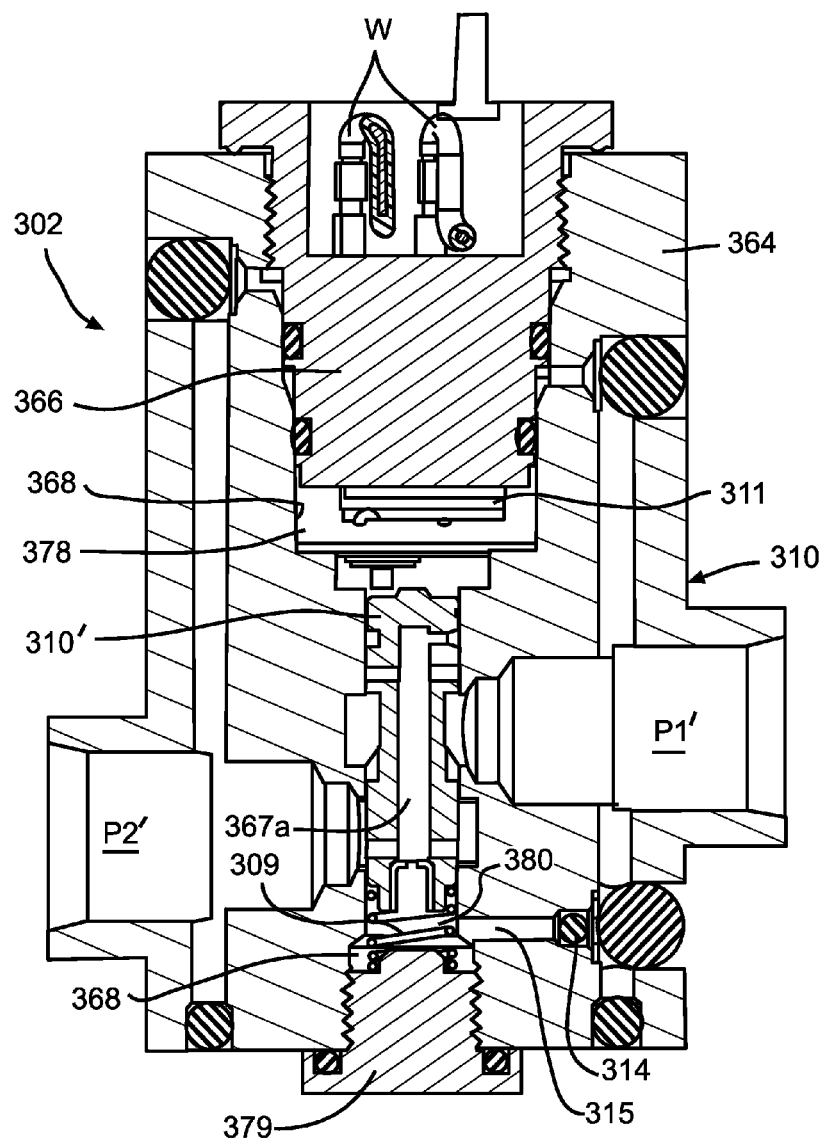
FIG. 9C is a sectional view of the device shown in FIG. 9B, taken along the line 9C-9C.

FIG. 9 is a perspective view of a third embodiment of the novel expansion valve arrangement illustrated in FIG. 3, with the expansion valve arrangement of the third embodiment being generally indicated at 302. The expansion valve arrangement 302 is disposed within a valve housing 364. FIG. 9A is a front elevation view of the valve housing 364. A first connection port P1' is provided for connection to external system piping, such as the pipeline 260 of the heat pump type refrigeration cycle apparatus 200 illustrated in FIG. 2. Similarly, a second connection port P2' is provided for connection to external system piping, such as the fluid conduit connected to the outdoor heat exchanger 220 illustrated in FIG. 2. Wiring W for control of an electrically operated pilot valve 311 (see FIG. 9C) extends out of the top (as viewed in FIG. 9) of the valve housing 364. FIG. 9B is a side elevation view of the device of FIG. 9, viewing the first connection port P1'.

FIG. 9C is a sectional view of the device shown in FIG. 9B, taken along the line 9C-9C. As can easily be seen, the expansion valve arrangement 302 is similar to the first expansion valve arrangement 202 illustrated in FIG. 5, except that no sleeve similar to the sleeve 270 is utilized. Instead a pilot operated main spool valve, indicated generally at 310, includes a spool 310' that may move between open and closed positions in a stepped bore 368 defined in the valve housing 364 (and is preferably positionable to one or more throttled positions) for controlling fluid flow between the first connection port P1' and the second connection port P2'. A plug 379, similar in form and function to the plug 279 seals the lower (as viewed in FIG. 9C) end of the bore 368. A mounting structure 366, upon which the pilot valve 311 may suitably be mounted, seals the upper as viewed in FIG. 9C) end of the bore 368. The plug 379, the valve housing 364, and the spool 310' cooperate to define a variable volume feedback chamber 380, similar to the feedback chamber 280 described above. Like the spool 210' described above, the spool 310' is positioned by an interplay of forces developed by fluid pressure in the feedback chamber 380, a spring 309 similar in form and function to the spring 209, and a command chamber 378 similar to the command chamber 278. The pilot valve 311, like the pilot valve 211, is preferably an electrically operated microvalve communicating with the command chamber 378 to provide a command pressure to the command chamber 378.

As shown in FIG. 9C, the expansion valve arrangement 302 also includes a check valve 314 that is disposed in a fluid conduit 315 that is similar to the fluid conduit 215. The check valve 314 operates similarly to the check valve 214 to fully open the pilot operated main spool valve 310 to permit a majority of the refrigerant to flow in a reverse direction, opposite the first direction, through the pilot operated main spool valve 310 when the pilot operated main spool valve 310 is a non-controlling expansion valve.

The check valve 314 is disposed in a fluid conduit 315 in fluid communication between the pipeline 260 and the fluid at feedback pressure acting on a second axial end of the pilot operated main spool valve 310. The check valve 314 only permits fluid flow through the fluid conduit 315 in a direction toward the first connection port P1'. In normal operation, when the pilot operated main spool valve 310 is the controlling expansion valve, the check valve 314 remains closed because the pressure in the pipeline 260 (and thus the first connection port P1') will be greater than the feedback pressure at the other end of the fluid conduit 315 connecting the check valve 314 to the feedback chamber 380.

In normal operation, when the pilot operated main spool valve 310 is not the controlling expansion valve, the first connection port P1' will be connected to the low-pressure/flow-out side, and the second connection port P2' will be connected to the high-pressure/flow-in side, due to reversal of the flow direction in the heat pump type refrigeration cycle apparatus 200. The pilot valve 311 is turned off (the control signal to the pilot valve 311 is reduced zero), allowing the pilot valve 311 to move to a position connecting the command chamber 378 to the high pressure fluid in the second connection port P2', so that high pressure is directed via the pilot valve 311 to increase command pressure to the same high pressure, which pressure acts on a first axial end of the pilot operated main spool valve 310, tending to open the pilot operated main spool valve 310. However, high-pressure fluid from the second connection port P2' is also directed through the feedback bore 367a to the second axial end of the spool 310' of the pilot operated main spool valve 310, counteracting the force from the control pressure. Since the force developed by the feedback pressure acts in the same direction as the force exerted by the spring 309, this would tend to cause the pilot operated main spool valve 310 to go shut but for the fact that the high pressure in the feedback chamber 380 also acts on the check valve 314.

The check valve 314, with high pressure from the feedback chamber 380 on the left side of the check valve 314 (as viewed in FIG. 9C) and low pressure on the right side of the check valve 314 (as viewed in FIG. 9C), opens up, thereby bleeding off at least some of the high pressure fluid being supplied to the feedback chamber 380 through the feedback bore 367a of the pilot operated main spool valve 310. This lowers pressure in the feedback chamber 380 sufficiently that the high pressure applied to the command chamber 278 overcomes the combined forces of the spring 309 and the force developed by the (now lower) pressure in the feedback chamber 380 to urge the pilot operated main spool valve 310 full open, permitting unrestricted flow of at least a majority of system flow through the pilot operated main spool valve 310 from the second connection port P2' to the first connection port P1', i.e., in a direction reverse of that which occurs when the pilot operated main spool valve 310 is the controlling expansion valve. The check valve 314 does not have to be so large that it could pass full system flow or even the majority of refrigerant passing through the valve arrangement 302. The check valve 314 only needs to pass a very small amount of flow to the now lower pressure port P1' to lower pressure sufficiently that the sum of spring force from the spring 309 and the feedback pressure force acting on second axial end 362 of the spool 310' of the pilot operated main spool valve 310 is less than the control pressure force acting in the opposite direction on the first axial end 361 of the pilot operated main spool valve 310, causing the pilot operated main spool valve 310 to open fully when the pilot operated main spool valve 310 is not the controlling expansion valve.

Figure 10:
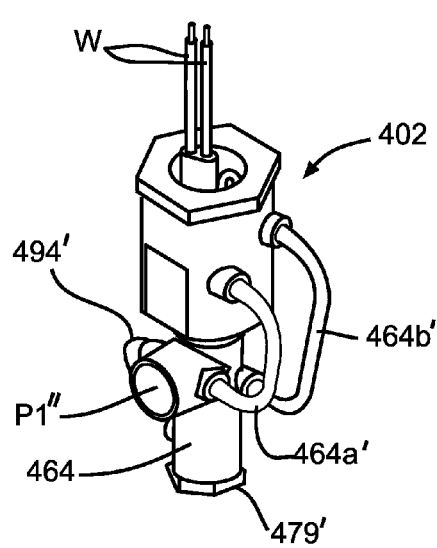
FIG. 10 is a first top perspective view of a fourth embodiment of the novel valve arrangement illustrated in FIG. 3.
Figure 10A:
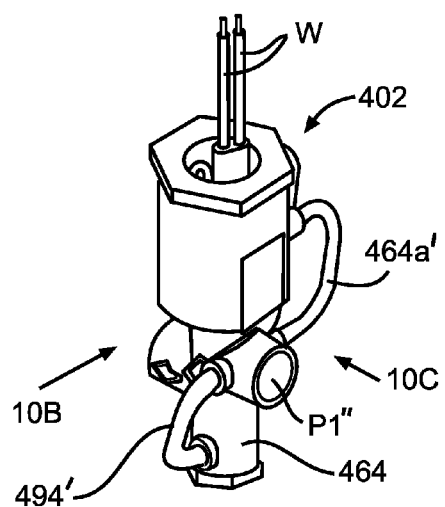
FIG. 10A is a second top perspective view of the device of FIG. 10.

FIG. 10 is a first top perspective view of a fourth embodiment of the novel expansion valve arrangement illustrated in FIG. 4, with the expansion valve arrangement of the fourth embodiment being generally indicated at 402. The expansion valve arrangement 402 is disposed within a valve housing 464. FIG. 10A is a second top perspective view of the expansion valve arrangement 402 of FIG. 10, showing an side of the valve housing 464 adjacent to that shown in FIG. 10. FIG.

10B is a front elevation view of the valve housing 464. A first connection port P1" is provided for connection to external system piping, such as the pipeline 260 of the heat pump type refrigeration cycle apparatus 200 illustrated in FIG. 2. Similarly, a second connection port P2" is provided for connection to external system piping, such as the fluid conduit connected to the outdoor heat exchanger 220 illustrated in FIG. 2. Wiring W for control of an electrically operated pilot valve 411 (see FIGS. 10D and 10E) extends out of the top (as viewed in FIG. 10) of the valve housing 464.

Figure 10C:
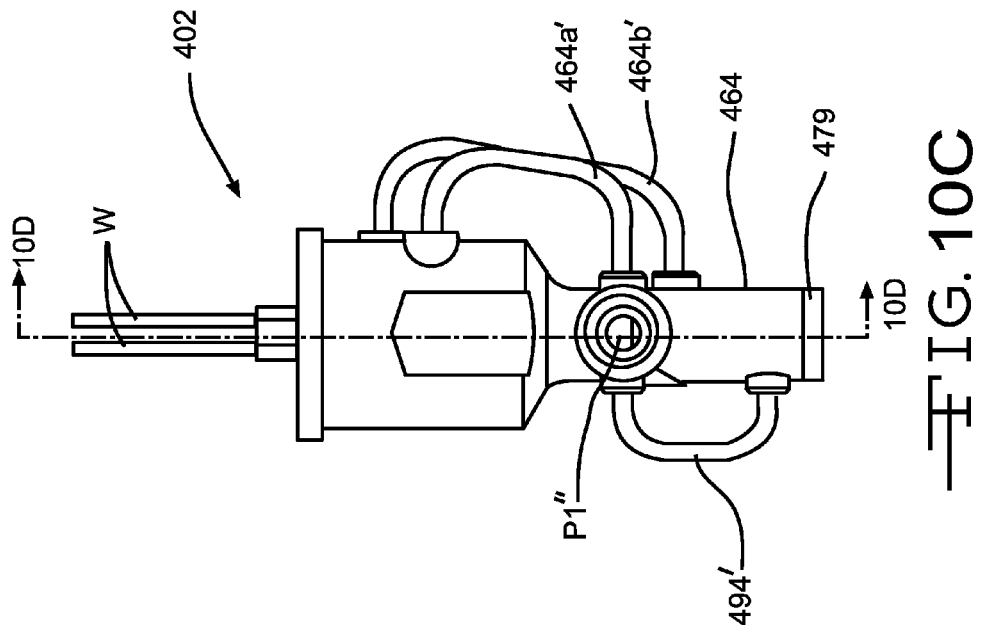
FIG. 10C is a front elevation view of the device of FIG. 10A, as viewed along the line 10C.
Figure 10B:
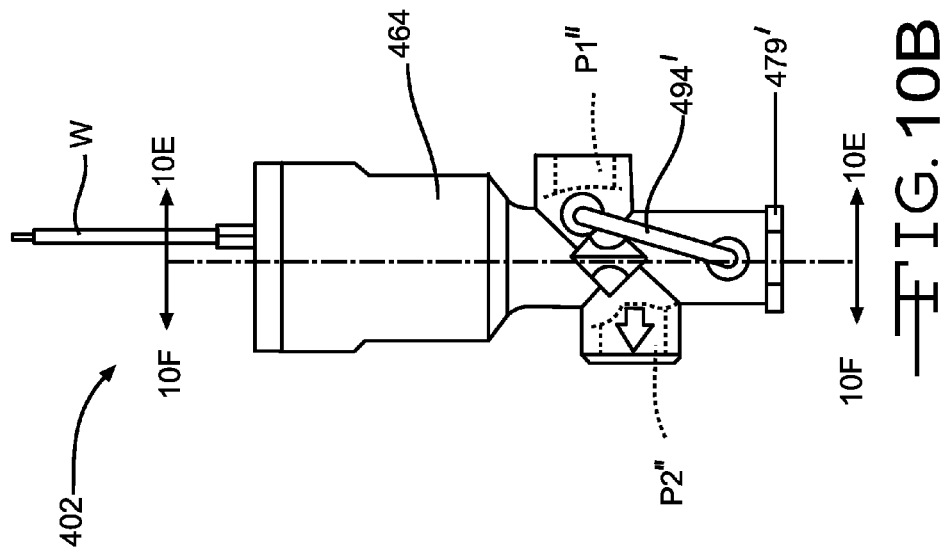
FIG. 10B is a side elevation view of the device of FIG. 10A, as viewed along the line 10B.
Figure 10E:
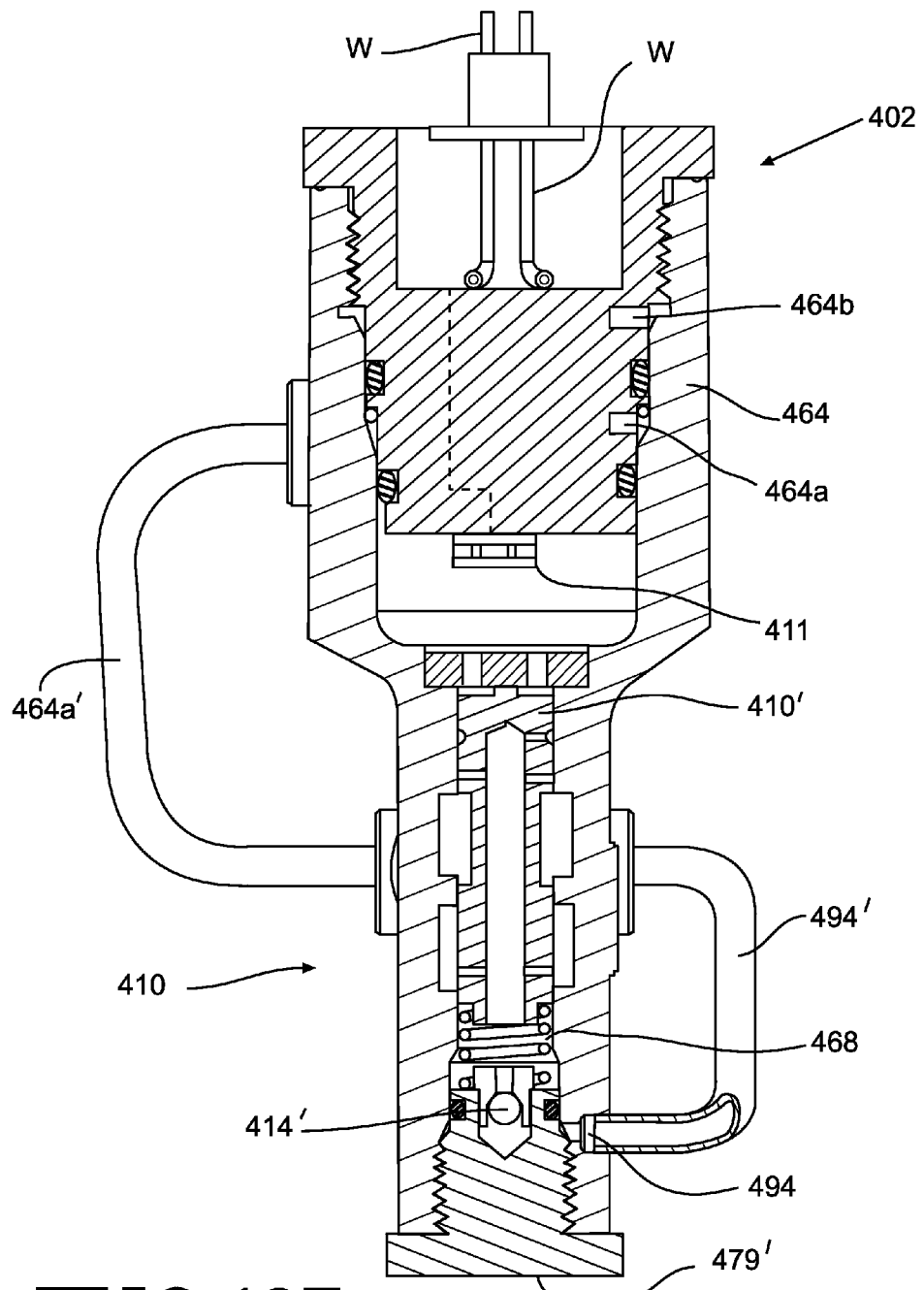
FIG. 10E is a sectional view of the device shown in FIG. 10B, taken along the line 10E-10E.

Referring to FIG. 10D, which is a sectional view of the expansion valve arrangement 402 shown in FIG. 10C, taken along the line 10D-10D, and FIG. 10E, which is a sectional view of the expansion valve arrangement 402 taken along the line 10E-10E shown in FIG. 10B, it will be appreciated that the expansion valve arrangement 402 is similar to the expansion valve arrangement 202' illustrated in FIG. 7, with two notable differences.

First, similar to the third embodiment illustrated in FIGS. 9 through 9C, and unlike the second embodiment illustrated in FIG. 7, no sleeve similar to the sleeve 270 is utilized. Instead a pilot operated main spool valve, indicated generally at 410, includes a spool 410' that substantially seals against the surface defining a bore 468 defined in the valve housing 464. The spool 410' may move in the bore 468 for controlling fluid flow between the first connection port P1" and the second connection port P2". Thus the pilot operated main spool valve 410 may be seen to operate functionally equivalently to the pilot operated main spool valve 210 of the second embodiment illustrated in FIG. 7.

Second, the expansion valve arrangement 402 may be provided with a first housing passageway 464a functionally equivalent to the first housing passageway 264a of the second embodiment illustrated in FIG. 7 for providing fluid communication between the pilot valve 411 and the first connection port P1". However, unlike the first housing passageway 264a, the passageway 464a may be at least partially defined through a tube 464a' (illustrated in FIGS. 10, 10A, 10C, and 10E) external to the valve housing 464. Similarly, the expansion valve arrangement 402 may be provided with a second housing passageway 464b functionally equivalent to the second housing passageway 264b for providing fluid communication between the pilot valve 411 and the second connection port P2". However, unlike the second housing passageway 264b, the passageway 464b may be at least partially defined through a tube 464b' (illustrated in FIGS. 10, 10C, 10F, 10G, and 10H) external to the valve housing 464. Finally, the expansion valve arrangement 402 may be provided with a passageway 494 functionally equivalent to the fluid passageway 294 to connect a check valve 414' to the first connection port P1". Unlike the passageway 294, the passageway 494 may be at least partially defined through a tube 494' (illustrated in FIGS. 10, 10A, 10b, 10C, 10E, 10F, 10G, and 10H) external to the valve housing 464.

The check valve 414' may be of any suitable arrangement; the check valve 414' illustrated in FIGS. 10D-10H is identical in structure and function to the check valve 214' illustrated in FIGS. 7, 8A, and 8B, and accordingly will not be further described. The check valve 414' may be mounted in a plug 479' that seals the lower (as viewed in FIG. 10D and FIG. 10E) end of the bore 468. The plug 479' may be identical in structure and function to the plug 279' illustrated in FIGS. 7, 8, and 8A, and accordingly will not be further described. Similarly, the pilot valve 411 may be identical in structure and function to the pilot valve 211 of the embodiment shown in FIG. 7. The pilot valve 411 may be interconnected with other components of the expansion valve arrangement 402 in a manner functionally equivalent to the pilot valve 211.

Figure 10F:
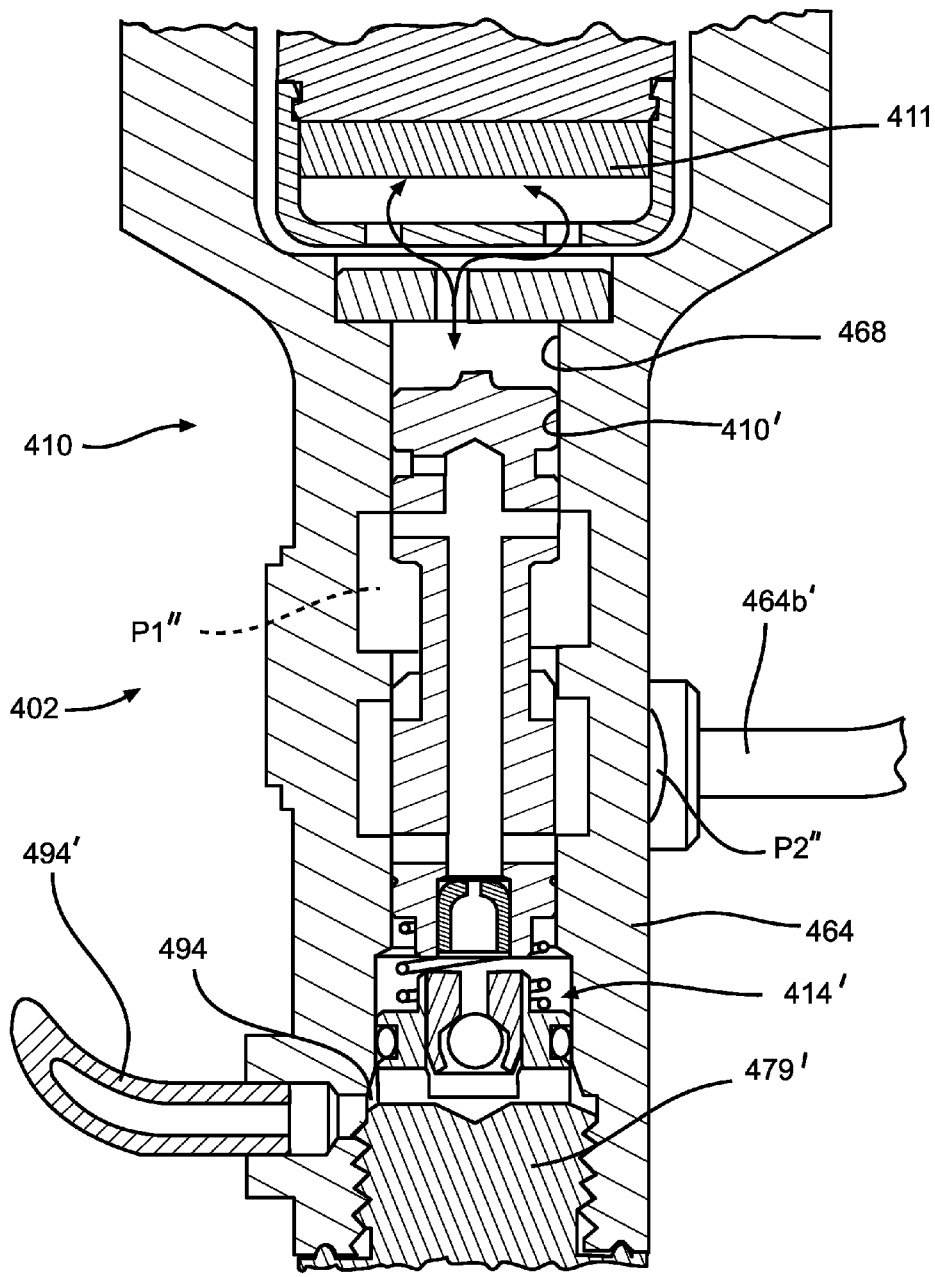
FIG. 10F is an enlarged partial sectional view of the device shown in FIG. 10B, taken along the line 10E-10F, which is in the opposite direction to the view of FIG. 10E, showing the device in a fully open position.
Figure 10G:
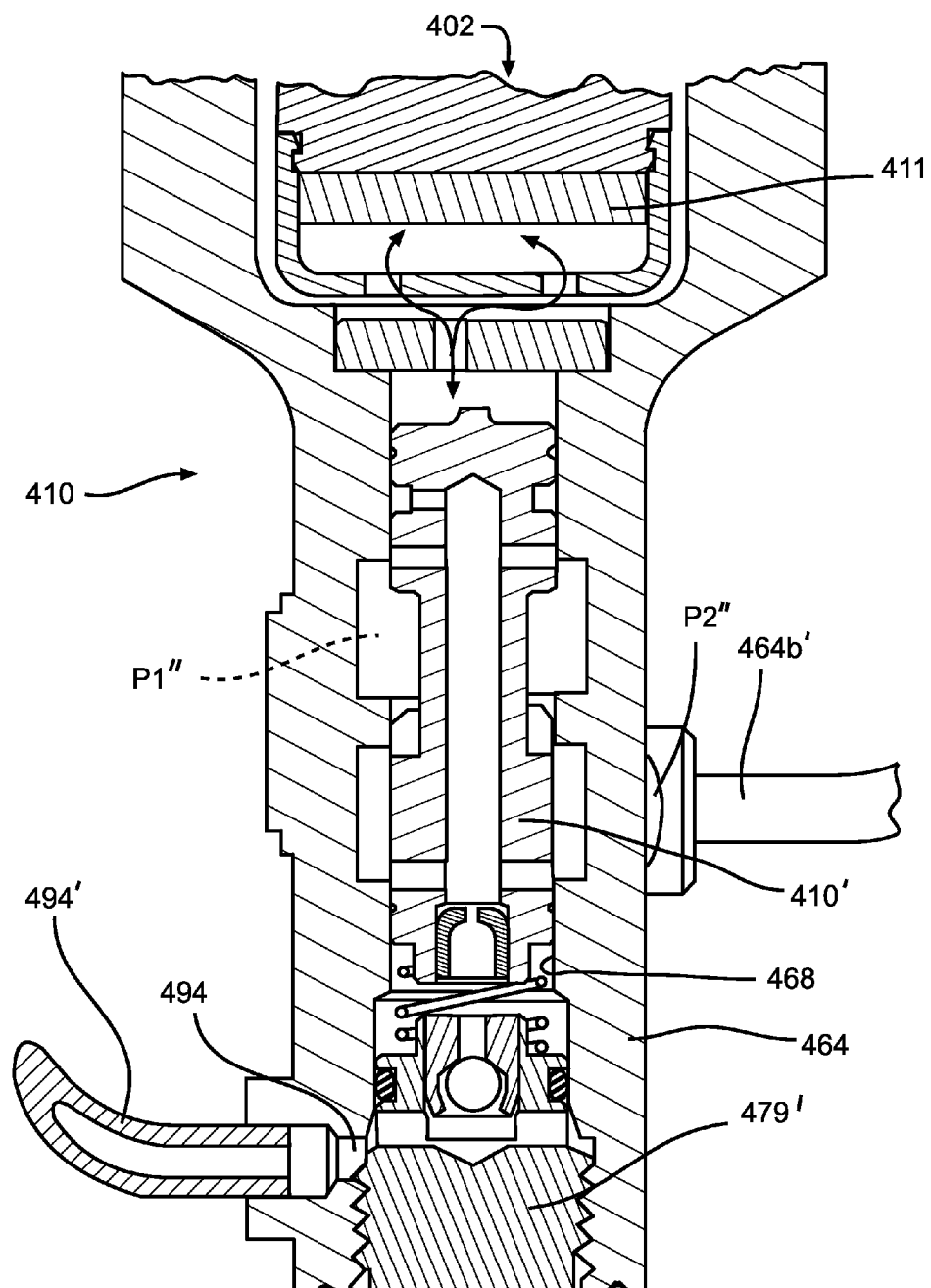
FIG. 10G is a view similar to that of FIG. 10F, except showing the device in an intermediate, throttled position.
Figure 10H:
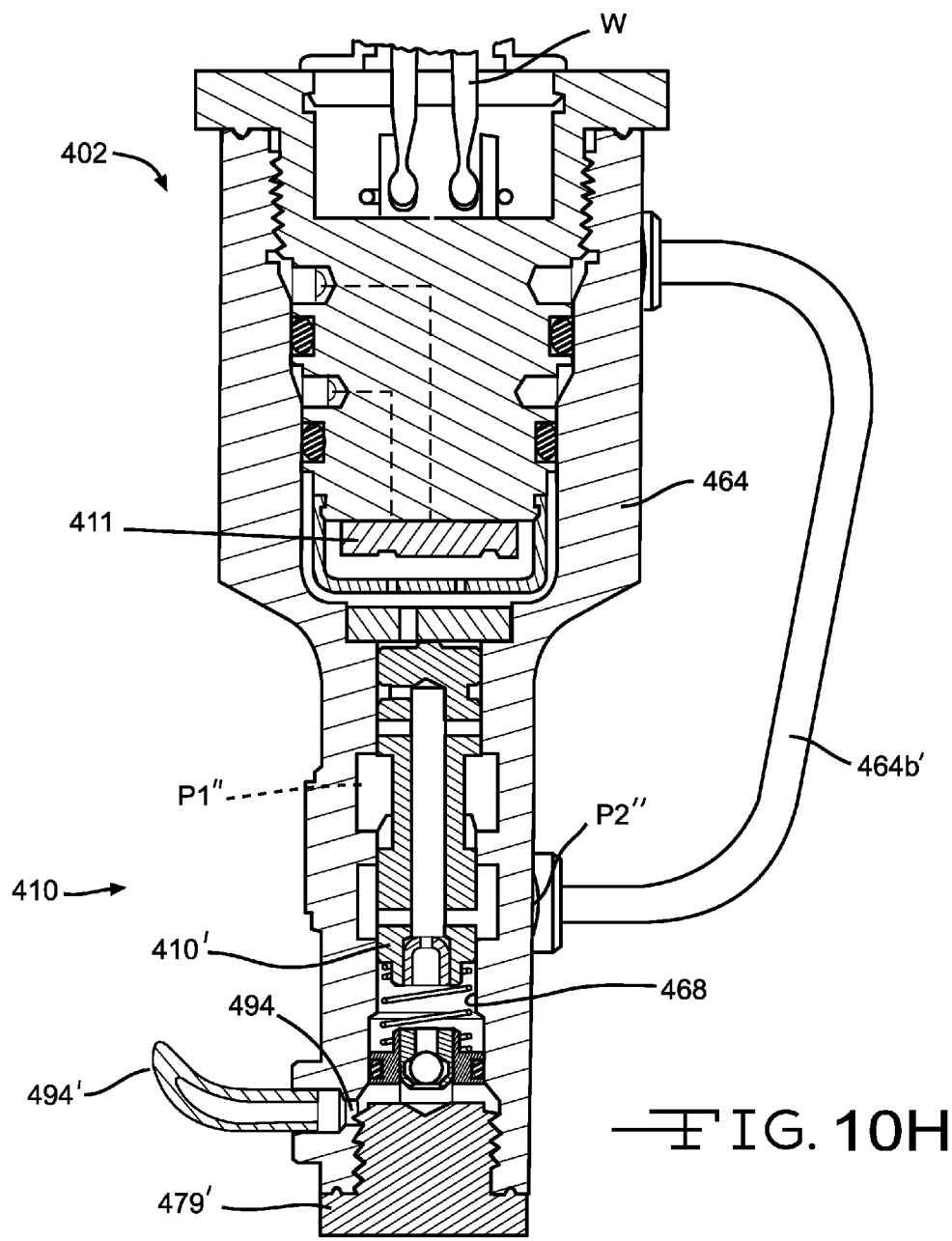
FIG. 10H is a view similar to that of FIGS. 10F and 10G, except showing the device in an closed position.

It will be appreciated that the pilot operated main spool valve 410 may operate functionally equivalently to the pilot operated main spool valve 210 of the embodiment shown in FIG. 7. The spool 410' may move between an open position (illustrated in FIG. 10F) and a closed position (illustrated in FIG. 10H) in the bore 468 (and is preferably positionable to one or more throttled positions, one of which is illustrated in FIG. 10G) for controlling fluid flow between the first connection port P1" and the second connection port P2". The open position illustrated in FIG. 10F is the most open position to which the spool 410' may be moved in operation and may be termed a fully open or unthrottled position. The closed position illustrated in FIG. 10H may be termed a throttled position, and more particularly a fully throttled position.

Accordingly, it will be appreciated that the operation of the expansion valve arrangement 402 in the heat pump type refrigeration cycle apparatus 200 will be as described above with respect to the use of the expansion valve arrangement 402 as either the first expansion valve arrangement 202 or the second expansion valve arrangement 206.

In summary, an aspect of the invention relates to a valve arrangement (such as the first expansion valve arrangement 202 or the second expansion valve arrangement 206) which includes:

a housing (such as the valve housing 264, 364, or 464) defining a first port (such as one of the first connection port P1 (or P1', P1") and the second connection port P2 (or P2', P2")) for connection to an external fluid circuit, a second port (such as the other one of the first connection port P1 (or P1', P1") and the second connection port P2 (or P2', P2")) for connection to the external fluid circuit;

a first fluid passageway (such as the main flow path through the pilot operated main spool valve 210, 310, or 410) providing fluid communication between the first port and the second port; and a second fluid passageway (such as the fluid conduit 215, 294, 315, or 494) providing fluid communication with the first port; and a control element (such as the spool 210', 310', or 410') disposed in the housing and positioned by a balance of forces acting thereon, the control element being positionable to one or more throttled positions for controlling fluid flow through the first fluid passageway from the first port to the second port, the control element being positionable to a fully open position to permit relatively unrestricted fluid flow through the first fluid passageway from the second port to the first port;

a check valve (such as the check valve 214, 214', 314, or 414') disposed in the second fluid passageway for preventing fluid flow through the second fluid passageway from the first port when fluid pressure in the first port is greater than fluid pressure in the second port, and permitting fluid flow through the second fluid passageway to the first port when fluid pressure in the first port is less than the fluid pressure in the second port thereby affecting the balance of forces acting on the control element such that the control element is urged toward the fully open position.

Another aspect of the invention relates to a valve arrangement, which includes:
- a housing defining a first port and a second port;
- a check valve which shuts when fluid pressure is greater in the first port than the second port, and which opens when fluid pressure is greater in the second port than the first port; and
- an expansion valve for throttling the flow of a refrigerant fluid from the first port to the second port when electrically energized and fluid pressure is greater in the first port than the second port, the expansion valve operating under a balance of forces which would tend to cause the expansion valve to move to a closed position when electrically deenergized and fluid pressure is greater in the second port than the first port but for the operation of the check valve, which check valve, when open, causes a balance of forces that tend to cause the expansion valve to move to an open position when electrically deenergized and fluid pressure is greater in the second port than the first port, permitting fluid flow through the expansion valve from the second port to the first port.

Another aspect of the invention relates to an apparatus which includes
- a refrigerant expansion valve and a check valve, the refrigerant expansion valve including
    - a housing defining
        - a first port;
        - a second port; and
        - a first fluid passageway providing refrigerant fluid communication between the first port and the second port; and
    - a control element disposed in the first passageway,
        - the control element being positionable to one or more throttled positions for controlling fluid flow through the first passageway from the first port to the second port,
        - the control element being positionable to a fully open position to allow a maximum flow rate of refrigerant fluid through the first passageway from the second port to the first port;
- the check valve being disposed in a second fluid passageway providing refrigerant fluid communication between the second port and the first port, the check valve preventing refrigerant fluid flow through the second passageway from the first port to the second port, the check valve permitting a second flow rate of refrigerant fluid from the second port to the first port through the second passageway, the first flow rate being greater than the second flow rate.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A valve arrangement, comprising:
   a housing defining
   a first port for connection to an external fluid circuit;
   a second port for connection to the external fluid circuit; and
   a first fluid passageway providing fluid communication between the first port and the second port;
   a second fluid passageway providing fluid communication with the first port;
   a control element disposed in the housing and positioned by a balance of forces acting thereon, the control element being positionable to one or more throttled positions for controlling fluid flow through the first fluid passageway from the first port to the second port, the control element being positionable to a fully open position to permit relatively unrestricted fluid flow through the first fluid passageway from the second port to the first port; and
   a check valve disposed in the second fluid passageway for preventing fluid flow through the second fluid passageway from the first port when fluid pressure in the first port is greater than fluid pressure in the second port, and permitting fluid flow through the second fluid passageway to the first port when fluid pressure in the first port is less than the fluid pressure in the second port thereby affecting the balance of forces acting on the control element such that the control element is urged toward the fully open position.

2. The valve arrangement of claim 1, wherein the control element permits a flow rate therethrough from the second port to the first port, which flow rate through the control element is greater than a concurrent flow rate through the check valve.

3. The valve arrangement of claim 1, wherein the control element and the check valve are both disposed in the housing and control flow through fluid passageways defined in the housing.

4. The valve arrangement of claim 1, wherein the control element is disposed in a bore defined in the housing to control flow through the first fluid passageway.

5. The valve arrangement of claim 4, further including a plug sealing an end of the bore defined in the housing.

6. The valve arrangement of claim 5, the plug defining a portion of the second fluid passageway, the check valve being disposed at least partially in the portion of the second fluid passageway defined in the plug.

7. The valve arrangement of claim 5, the housing defining a portion of the second fluid passageway, the check valve being disposed at least partially in the portion of the second fluid passageway defined in the housing.

8. The valve arrangement of claim 1, further including a tube connected to the housing, a portion of at least one of the first fluid passageway and the second fluid passageway being defined in the tube.

9. The valve arrangement of claim 1, wherein the second fluid passageway is defined at least partially external to the housing.

10. The valve arrangement of claim 1, wherein:
    the control element has a first end and a second end;
    the housing and the control element cooperate to define a command chamber at the first end of the control element, fluid pressure in the command chamber developing a control force tending to move the control element toward a more fully open position;
    the housing and the control element cooperate to define a feedback chamber at the second end of the control element, fluid pressure in the feedback chamber developing a feedback force tending to move the control element toward a more fully closed position; and
    a portion of the second fluid passageway providing fluid communication between the second port and the check valve being in fluid communication with the feedback chamber.

11. The valve arrangement of claim 10, further including a spring developing a spring force to move the control element toward the more fully closed position.

12. The valve arrangement of claim 10, further including a pilot valve that can be operated to selectively place the command chamber in fluid communication with the first port or the second port.

13. The valve arrangement of claim 12, wherein the pilot valve is a microvalve.

14. The valve arrangement of claim 12, wherein the pilot valve is an open center 3-way microvalve disposed in the command chamber.

15. A valve arrangement, comprising:
a housing defining a first port and a second port;
a check valve which shuts when fluid pressure is greater in the first port than the second port, and which opens when fluid pressure is greater in the second port than the first port; and
an expansion valve for throttling the flow of a refrigerant fluid from the first port to the second port when electrically energized and fluid pressure is greater in the first port than the second port, the expansion valve operating under a balance of forces which cause the expansion valve to move to a closed position when electrically deenergized and fluid pressure is greater in the second port than the first port but for the operation of the check valve, which check valve, when open, causes a balance of forces that cause the expansion valve to move to an open position when electrically deenergized and fluid pressure is greater in the second port than the first port, permitting fluid flow through the expansion valve from the second port to the first port.

16. The valve arrangement of claim 15, wherein the expansion valve permits a flow rate therethrough from the second port to the first port that is greater than a concurrent flow rate through the check valve.

17. The valve arrangement of claim 15, wherein the expansion valve and the check valve are both disposed in the housing.

18. The valve arrangement of claim 15, wherein:
the housing further defines a bore;
the expansion valve further includes a spool disposed in the bore, which spool is movable to control the flow of the refrigerant fluid from the first port to the second port; and
the valve arrangement further includes a plug sealing an end of the bore, the plug defining a passageway communicating with the second port, the check valve being disposed in the passageway.

19. An apparatus, comprising: a refrigerant expansion valve, including a housing defining a first port; a second port; and a first fluid passageway providing refrigerant fluid communication between the first port and the second port; and a control element disposed in the first passageway, the control element being positionable to one or more throttled positions for controlling fluid flow through the first passageway from the first port to the second port, the control element being positionable to a fully open position to allow a maximum flow rate of refrigerant fluid through the first passageway from the second port to the first port; and a check valve disposed in a second fluid passageway providing refrigerant fluid communication between the second port and the first port, the check valve preventing refrigerant fluid flow through the second passageway from the first port to the second port, the check valve permitting a second flow rate of refrigerant fluid from the second port to the first port through the second passageway thereby affecting a balance of forces acting on the control element such that the control element is urged toward the fully open position, the maximum flow rate being greater than the second flow rate.

* * * * *